US012797740B2

(12) United States Patent
Su et al.

(10) Patent No.: US 12,797,740 B2
(45) Date of Patent: Nov. 17, 2026

(54) METHOD AND APPARATUS FOR CONTROLLING VIRTUAL THROWABLE, DEVICE, MEDIUM, AND PROGRAM PRODUCT

(71) Applicant: Tencent Technology (Shenzhen) Company Limited, Shenzhen (CN)

(72) Inventors: Xitong Su, Shenzhen (CN); Yibo Wang, Shenzhen (CN); Yiming Sun, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 263 days.

(21) Appl. No.: 18/823,553

(22) Filed: Sep. 3, 2024

(65) Prior Publication Data

US 2024/0424400 A1 Dec. 26, 2024

Related U.S. Application Data

(63) Continuation of application No. PCT/CN2023/119994, filed on Sep. 20, 2023.

(30) Foreign Application Priority Data

Dec. 7, 2022 (CN) ......................... 202211567170.9

(51) Int. Cl.

| | |
|---|---|
| ***A63F 13/573*** | (2014.01) |
| ***A63F 13/577*** | (2014.01) |
| ***A63F 13/58*** | (2014.01) |

(52) U.S. Cl.

CPC .......... *A63F 13/573* (2014.09); *A63F 13/577* (2014.09); *A63F 13/58* (2014.09)

(58) Field of Classification Search

CPC ...... A63F 13/573; A63F 13/577; A63F 13/58; A63F 13/57; A63F 13/837

See application file for complete search history.

(56) References Cited

U.S. PATENT DOCUMENTS 5,920,492 A * 7/1999 Montag .................. G06T 15/00 434/226

FOREIGN PATENT DOCUMENTS

| | | |
|---|---|---|
| CN | 110478900 A | 11/2019 |
| CN | 110852005 A | 2/2020 |

(Continued)

OTHER PUBLICATIONS

Tencent Technology, WO+IPRP, PCT/CN2023/119994, Jul. 10, 2025, 5 pgs.

(Continued)

*Primary Examiner* — Thomas H Henry

(74) *Attorney, Agent, or Firm* — Morgan, Lewis & Bockius LLP

(57) ABSTRACT

This application discloses a method for controlling a virtual throwable performed by a computer device. The method includes: in response to a thrown virtual throwable exploding and releasing a virtual fluid substance in a virtual environment picture, defining special effect cells in a first range centered around an explosion point of the virtual throwable; traversing the special effect cells in the first range, and identifying, among the special effect cells, one or more valid special effect cells in the first range satisfying a valid diffusion condition; and when the virtual fluid substance encounters a virtual obstacle during diffusion, diffusing the virtual fluid substance based on one of the one or more valid special effect cells on a surface of the virtual (Continued)

obstacle, the valid diffusion condition comprising at least one of the one or more valid special effect cells not overlapping the virtual obstacle.

20 Claims, 18 Drawing Sheets

(56) References Cited

FOREIGN PATENT DOCUMENTS

| | | | |
|---|---|---|---|
| CN | 111111217 | A | 5/2020 |
| CN | 112862942 | A | 5/2021 |
| JP | H 08320949 | A | 12/1996 |
| WO | WO 1996037863 | A1 | 11/1996 |
| WO | WO 2008104783 | A1 | 9/2008 |

OTHER PUBLICATIONS

Tencent Technology, Japanese Office Action, JP Patent Application No. 2025-520948, Feb. 10, 2026, 9 pgs.

Docs.unity3d.com, "Simple Explosions Unity User Manual", Version 2018.4, Jul. 2017, Retrieved from the Internet: https://docs.unity3d.com/ja/2018.4/Manual/PartSysExplosion.html.

Note.com, kurohishi@multi-game creator, "Unity VFX Effects Are an Endless Toy", Mar. 2022, Retrieved from the Internet: https://note.com/yuzan_kurohishi/n/n58a79ed5ecce.

Qitta.com, (Takeshi Nick Osanai), "About Manhattan Distance", Apr. 2022, Retrieved from the Internet: https://giita.com/TakeshiNickOsanai/items/68a9b22af43d69288419.

Web.archive.org, "[Blender 3.0] Let's Create Various Explosion Effects!", Jun. 2022, Retrieved from the Internet: http://web.archive.org/web/20221203122047/https://cgbox.jp/2022/02/16/blender-explosion/.

Zenn.Dev, Abe Sotaro, "(EmberGen) Explosion—From How to Make It to How to Output It—How to Create and Output Explosions From Scratch Using EmberGen", EmberGen: v0.7.5.2, Jan. 2022, Retrieved from the Internet: https://zenn.dev/sotaro abe/articles/e73f41126729d4.

Tencent Technology, ISR, PCT/CN2023/119994, Nov. 23, 2023, 2 pgs.

* cited by examiner (b)

(a)

(a) (b)

(b)

(a)

(a)

(b)

METHOD AND APPARATUS FOR CONTROLLING VIRTUAL THROWABLE, DEVICE, MEDIUM, AND PROGRAM PRODUCT

CROSS-REFERENCE TO RELATED APPLICATIONS

This application is a continuation application of PCT Patent Application No. PCT/CN2023/119994, entitled "METHOD AND APPARATUS FOR CONTROLLING VIRTUAL THROWABLE, DEVICE, MEDIUM, AND PROGRAM PRODUCT" filed on Sep. 20, 2023, which claims priority to Chinese Patent Application No. 202211567170.9, entitled "METHOD AND APPARATUS FOR CONTROLLING VIRTUAL THROWABLE, DEVICE, MEDIUM, AND PROGRAM PRODUCT" filed with the China National Intellectual Property Administration on Dec. 7, 2022, both of which are incorporated herein by reference in their entirety.

FIELD OF THE TECHNOLOGY

Embodiments of this application relate to the field of human-computer interaction, and in particular, to a method and an apparatus for controlling a virtual throwable, a device, a medium, and a program product.

BACKGROUND OF THE DISCLOSURE

Currently, shooting games have increasingly diverse types and modes.

In the related art, after a shooting game is started, a user may control a virtual object to use a virtual throwable in a virtual environment, and then perform a next action based on a special effect generated by the virtual throwable. For example, the user controls the virtual object to throw a "virtual smoke bomb" in the virtual environment, and performs an attack or escapes under smoke generated by the "virtual smoke bomb".

However, in the above related art, the special effect is displayed in a specific radius centered around the virtual throwable, and the special effect is constant. A smoke scene simulated in this manner is not realistic.

SUMMARY

This application provides a method and an apparatus for controlling a virtual throwable, a device, a medium, and a program product. The technical solutions are as follows:

According to an aspect of this application, a method for controlling a virtual throwable is performed by a computer device, and the method includes:

- in response to a thrown virtual throwable exploding and releasing a virtual fluid substance in a virtual environment picture, defining special effect cells in a first range centered around an explosion point of the virtual throwable;
- traversing the special effect cells in the first range, and identifying, among the special effect cells, one or more valid special effect cells in the first range satisfying a valid diffusion condition; and
- when the virtual fluid substance encounters a virtual obstacle during diffusion, diffusing the virtual fluid substance based on one of the one or more valid special effect cells on a surface of the virtual obstacle, the valid diffusion condition comprising at least one of the one or more valid special effect cells not overlapping the virtual obstacle.

In some embodiments, the special effect cells are set in the first range centered around the explosion point of the virtual throwable.

The special effect cells in the first range are traversed, and the special effect cell in the first range satisfying the valid diffusion condition is determined as a valid special effect cell.

A quantity of valid special effect cells corresponding to the diffusion range at the $i^{th}$ moment and a first position occupied by a dynamic virtual obstacle are determined based on a diffusion range of the virtual fluid substance at an $i^{th}$ moment.

A quantity of valid special effect cells occupied by the dynamic virtual obstacle is determined in response to the dynamic virtual obstacle moving to a second position at an $(i+1)^{th}$ moment.

Valid special effect cells are equi-proportionally added to the first position based on the quantity of valid special effect cells corresponding to the diffusion range of the virtual fluid substance at the $i^{th}$ moment and the quantity of valid special effect cells occupied by the dynamic virtual obstacle at the second position, and the virtual fluid substance is diffused based on the added valid special effect cells.

A quantity of valid special effect cells corresponding to the diffusion range of the virtual fluid substance varies in a normal distribution over time, and i is a positive integer.

According to another aspect of this application, a computer device is provided, including a processor and a memory, the memory having at least one computer program stored therein, the at least one computer program, when loaded and executed by the processor, causing the computer device to implement the method for controlling a virtual throwable described in the above aspect.

According to another aspect of this application, a non-transitory computer-readable storage medium is provided, having at least one computer program stored therein, the at least one computer program being loaded and executed by a processor, to implement the method for controlling a virtual throwable described in the above aspect.

The technical solutions provided in this application have at least the following beneficial effects:

The computer device sets the special effect cells in the first range centered around the explosion point of the virtual throwable in response to the thrown virtual throwable exploding and releasing the virtual fluid substance in the virtual environment picture; traverses the special effect cells in the first range, and determines the special effect cell in the first range satisfying the valid diffusion condition as a valid special effect cell; and diffuses, when the virtual fluid substance encounters the virtual obstacle during the diffusion, the virtual fluid substance based on the valid special effect cell on the surface of the virtual obstacle. According to this application, through the detection of the valid special effect cells around the virtual obstacle and the diffusion based on the valid special effect cells around the virtual obstacle, a realistic scenario of changing the direction of the virtual fluid substance when the virtual fluid substance encounters the obstacle is simulated, thereby simulating a more realistic diffusion effect of the virtual fluid substance.

DESCRIPTION OF EMBODIMENTS

Figure 1:
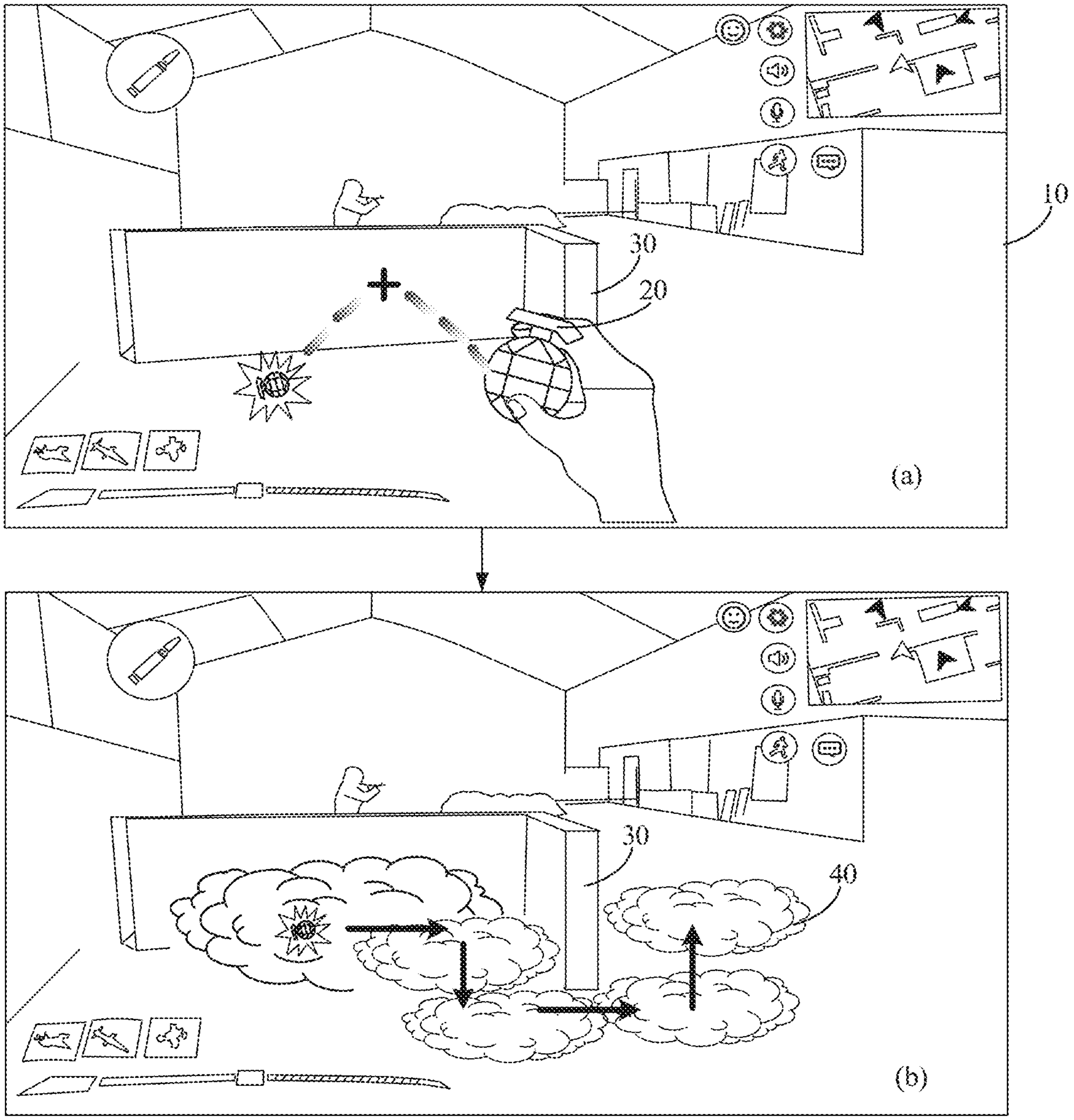
FIG. 1 is a schematic diagram of a method for controlling a virtual throwable according to an exemplary embodiment of this application.

To make objectives, technical solutions, and advantages of this application clearer, implementations of this application are described in further detail with reference to drawings.

First, terms involved in embodiments of this application are briefly described.

Virtual environment: It is a virtual environment displayed (or provided) when an application (APP) runs in a terminal. The virtual environment may be a simulated world, a semi-simulated and semi-fabricated three-dimensional (3D) world, or a completely fabricated 3D environment of the real world. The virtual environment may be any one of a two-dimensional (2D) virtual environment, a 2.5-dimensional (2.5D) virtual environment, and a 3D virtual environment. In some embodiments, the virtual environment is configured for a virtual environment battle between at least two virtual objects. The virtual environment has virtual resources available for the at least two virtual objects. In some embodiments, the virtual environment includes a lower left corner region and an upper right corner region that are symmetrical, and virtual objects belonging to two rival camps occupy respective regions.

Virtual object: It is a movable object in a virtual environment. The movable object may be at least one of a virtual character, a virtual animal, and a cartoon character. In some embodiments, when the virtual environment is a 3D virtual environment, the virtual object may be a 3D model. Each virtual object has a shape and a volume in the 3D virtual environment, and occupies a partial space in the 3D virtual environment. In some embodiments, the virtual object is a 3D character constructed based on a 3D human bone technology. The virtual object achieves different appearances by wearing different skins. In some implementations, the virtual object may be implemented by using a 2.5D or 2D model, which is not limited in the embodiments of this application.

Multiplayer online battle arena (MOBA) game: It refers to a game in which different virtual teams belonging to at least two rival camps occupy respective map regions and battle with each other for a victory condition in a virtual environment. The victory condition includes but is not limited to at least one of occupying a stronghold or destroying a rival camp stronghold, killing a virtual object of a rival camp, achieving survival in a specified scene and specified time, snatching a resource, and getting a higher score than an opponent in specified time. A MOBA game may be played in rounds. A map for each MOBA game may not or may vary. Each virtual team includes one or more virtual objects, for example, 1, 2, 3, or 5 virtual objects.

In response to: It indicates a condition or a state on which one or more to-be-performed operations rely. When the condition or the state is satisfied, the one or more operations may be performed in real time or at a set delay. Unless otherwise specified, a sequence in which a plurality of operations are performed is not limited.

Virtual throwable: It is a virtual item in a virtual environment available for a virtual object to throw.

In this application, a prompt interface and a pop-up window may be displayed or voice prompt information may be outputted before and during collection of relevant data of a user. The prompt interface, the pop-up window, or the voice prompt information is configured for prompting the user that relevant data of the user is currently being collected. Therefore, in this application, relevant operations of obtaining user-related data are performed only after a confirmation operation performed by the user on the prompt interface or the pop-up window is obtained. Otherwise (i.e., when no confirmation operation performed by the user on the prompt interface or the pop-up window is obtained), the relevant operations of obtaining user-related data are ended, i.e., the user-related data is not obtained. In other words, all user data collected in this application is collected with the consent and authorization of the user, and the collection, use, and processing of relevant user data need to comply with relevant laws, regulations, and standards of relevant countries and regions.

An embodiment of this application provides a method for controlling a virtual throwable. FIG. 1 is a schematic diagram of a method for controlling a virtual throwable according to an exemplary embodiment of this application. The method may be performed by a computer device. The computer device may be a terminal or a server.

As shown in (a) in FIG. 1, a virtual environment picture 10 is displayed on a user interface (UI). In response to a thrown virtual throwable 20 exploding in the virtual environment picture 10, the computer device displays a diffusive virtual fluid substance 40 released by the virtual throwable 20. In response to the virtual fluid substance 40 encountering a virtual obstacle 30 during diffusion, the computer device changes a diffusion direction of the virtual fluid substance 40 based on the virtual obstacle 30.

In some embodiments, the virtual throwable 20 includes at least one of a virtual smoke bomb, a virtual frangible grenade, a virtual gas bottle, and the like, which is not limited in this embodiment of this application.

Exemplarily, a manner of throwing the virtual throwable 20 includes at least one of a high throw, a low throw, and a rebound from impact of the virtual throwable 20, which is not limited in this application. In other words, the virtual throwable 20 may be thrown through at least one of the high throw, the low throw, and the rebound from impact.

In some embodiments, throwing the virtual throwable 20 through the high throw means throwing the virtual throwable 20 upward. In other words, an initial throwing direction of the virtual throwable 20 is an upward throwing direction. Throwing the virtual throwable 20 through the low throw means throwing the virtual throwable 20 downward. In other words, the initial throwing direction of the virtual throwable 20 is a downward throwing direction. Throwing the virtual throwable 20 through the rebound from impact means throwing the virtual throwable 20 toward an obstacle. In other words, the initial throwing direction of the virtual throwable 20 is a direction toward the virtual throwable 20. The virtual throwable 20 rebounds and switches to another direction when touching the obstacle.

The virtual fluid substance 40 refers to a virtual substance with a fluid property released by the virtual throwable 20. If a virtual smoke bomb is used as an example, the virtual fluid substance 40 refers to smoke released by the virtual smoke bomb.

Exemplarily, when the virtual fluid substance 40 encounters a virtual obstacle 30 during the diffusion, the virtual fluid substance 40 is diffused on a surface of the virtual obstacle 30.

Exemplarily, in response to a virtual object entering a diffusion range of the virtual fluid substance 40, the computer device controls an attribute value of the virtual object.

In some embodiments, the attribute value includes a health point and/or a skill point.

The computer device reduces the health point and/or the skill point in response to the virtual object entering the diffusion range of the virtual fluid substance 40.

For example, the virtual fluid substance 40 is a virtual stink bomb. After the virtual stink bomb explodes, the virtual stink bomb releases stink. When the virtual object enters a diffusion range of the stink, the health point and the skill point both decrease. When the health point of the virtual object is less than a health threshold, the virtual object enters a non-healthy state. When the skill point of the virtual object is less than a skill threshold, the virtual object is prevented from using a skill.

In some embodiments, the computer device sets special effect cells in a first range centered around an explosion point of the virtual throwable 20, the special effect cells being configured for determining the diffusion direction of the virtual fluid substance 40, and the first range being greater than a second range, the second range indicating the diffusion range of the virtual fluid substance 40.

The computer device traverses the special effect cells in the first range, and determines a special effect cell in the first range satisfying a valid diffusion condition as a valid special effect cell. The computer device determines the diffusion direction of the virtual fluid substance 40 based on the valid special effect cell.

The valid diffusion condition includes at least one of the special effect cell being in the second range, the special effect cell not overlapping the virtual obstacle 30, and the special effect cell being not traversed. In some embodiments, the valid diffusion condition includes all of the special effect cell being in the second range, the special effect cell not overlapping the virtual obstacle 30, and the special effect cell being not traversed.

Exemplarily, the computer device uses a special effect cell at which the explosion point is located as a starting special effect cell. The computer device traverses special effect cells adjacent to the starting special effect cell, determines a special effect cell that is adjacent to the starting special effect cell and satisfies the valid diffusion condition as a valid special effect cell, and determines the special effect cell as a next starting special effect cell; and repeats the above operation until all of the special effect cells in the first range are traversed.

In some embodiments, when the special effect cell at which the explosion point is located is a valid special effect cell, the special effect cell at which the explosion point is located is used as the starting special effect cell.

In some embodiments, when the special effect cell at which the explosion point is located is not a valid special effect cell, a special effect cell in the first range satisfying a ray detection condition is used as the starting special effect cell.

The ray detection condition includes that a to-be-detected special effect cell can be connected to the special effect cell at which the explosion point is located by a ray and that the to-be-detected special effect cell does not overlap the virtual obstacle.

In summary, according to method provided in this embodiment of this application, the computer device displays the virtual environment picture; displays the diffusive virtual fluid substance released by the virtual throwable in response to the thrown virtual throwable exploding in the virtual environment picture; and changes the diffusion direction of the virtual fluid substance based on the virtual obstacle in response to the virtual fluid substance encountering the virtual obstacle during the diffusion. According to this application, through the changing of the diffusion direction of the virtual fluid substance based on the virtual obstacle, a realistic scenario of changing the direction of the virtual fluid substance when the virtual fluid substance encounters the obstacle is simulated, thereby simulating a more realistic diffusion effect of the virtual fluid substance. In this way, user experience is improved.

The embodiments of this application provide a method and an apparatus for controlling a virtual throwable, a device, a medium, and a program product, so as to control a virtual throwable in a virtual scene in a flexible and simple manner, thereby improving human-computer interaction efficiency and the user experience. To make it easier to understand the method for controlling a virtual throwable in a virtual scene provided in the embodiments of this application, an exemplary implementation scenario of the method for controlling a virtual throwable in a virtual scene provided in the embodiments of this application is first described. A virtual scene in the method for controlling a virtual throwable in a virtual scene provided in the embodiments of this application may be outputted completely based on a terminal device or outputted collaboratively based on the terminal device and a server.

In some embodiments, the virtual scene may be an environment for virtual objects (for example, target virtual objects) to perform interactions. For example, game roles may battle in the virtual scene. Actions of the game roles may be controlled so that both parties can perform interactions in the virtual scene, thereby enabling a user to relieve life pressure during the gaming.

Figure 2:
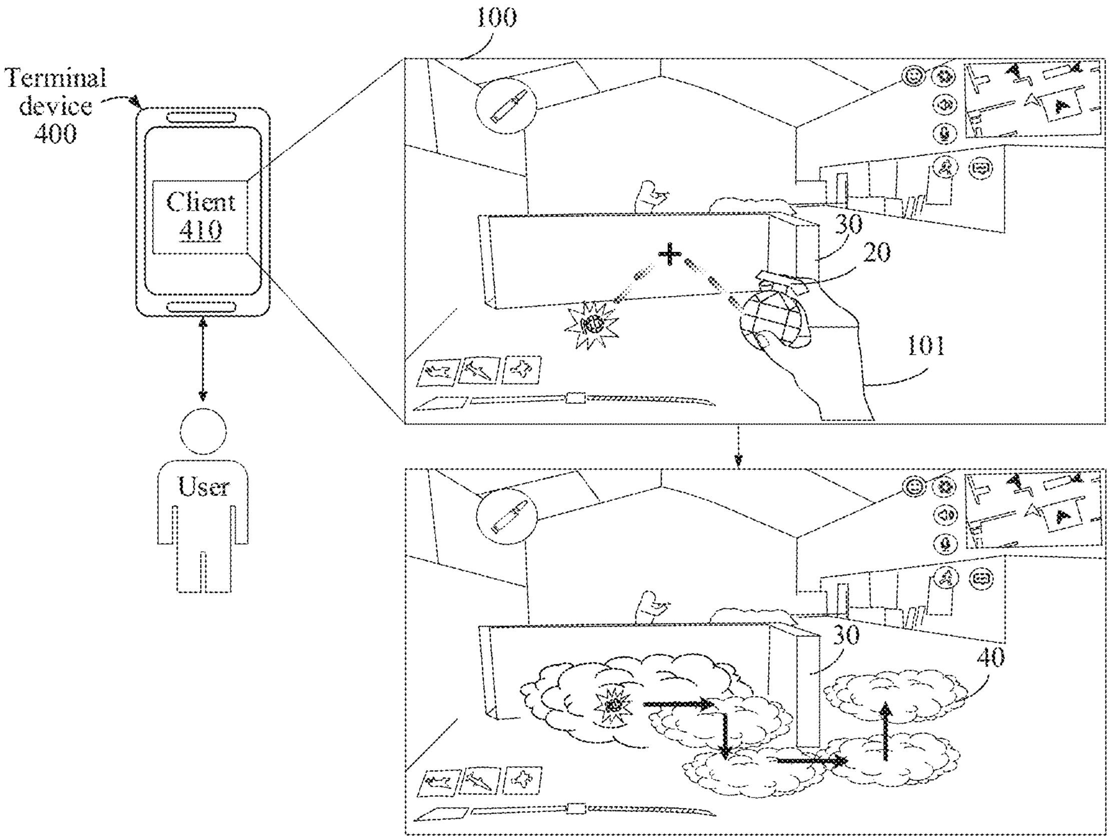
FIG. 2 is a schematic diagram of an application mode of a method for controlling a virtual throwable according to an exemplary embodiment of this application.

In an implementation scenario, FIG. 2 is a schematic diagram of an application mode of a method for controlling a virtual throwable according to an exemplary embodiment of this application. The method is applicable to application modes in which calculation of data related to a virtual scene can be completed merely through a computing capability of graphics processing hardware of a terminal device 400. For example, in a game in a stand-alone mode/an off-line mode, outputting of a virtual scene 100 is completed through various types of terminal devices 400 such as a smartphone, a tablet computer, and a virtual reality (VR)/augmented reality (AR) device.

In an example, types of the graphics processing hardware include a central processing unit (CPU) and a graphics processing unit (GPU).

When visual sensing of the virtual scene 100 needs to be formed, the terminal device 400 calculates data for display through the graphics computing hardware, completes loading, parsing, and rendering of the displayed data, and outputs a video frame that can form the visual sensing of the virtual scene on the graphics output hardware. For example, a 2D video frame is presented on a display of a smartphone, or a 3D video frame is projected onto lenses of AR/VR glasses. In addition, to enrich a sensing effect, the terminal device 400 may further form one or more of auditory sensing, tactile sensing, motion sensing, and taste sensing through different hardware.

In an example, a client 410 (for example, a stand-alone game APP) runs in the terminal device 400. A virtual scene including role play is outputted during the running of the client 410. The virtual scene may be an environment for game roles to perform interactions, for example, may be a plain, a street, or a valley for game roles to battle. An example in which the virtual scene 100 is displayed from a third-person perspective is used. A primary controlled virtual object 101 is displayed in the virtual scene 100. The primary controlled virtual object 101 may be a user-controlled game role, i.e., the primary controlled virtual object 101 is controlled by a real user, and is to move in the virtual scene 100 in response to an operation performed by the real user on a controller (for example, a touchscreen, a voice-operated switch, a keyboard, a mouse, or a joystick). For example, when the real user moves the joystick (including a virtual joystick and a real joystick) rightward, the primary controlled virtual object 101 moves rightward in the virtual scene 100, or may keep still or jump, and the primary controlled virtual object 101 is controlled to perform a shooting operation and the like.

For example, the primary controlled virtual object 101 is displayed in the virtual scene 100. In response to a thrown virtual throwable 20 exploding in the virtual environment 100, a diffusive virtual fluid substance 40 released by the virtual throwable 20 is displayed. In response to the virtual fluid substance 40 encountering a virtual obstacle 30 during diffusion, a diffusion direction of the virtual fluid substance 40 is changed based on the virtual obstacle 30. Through the changing of the diffusion direction of the virtual fluid substance 40 based on the virtual obstacle 30, a realistic scenario of changing the direction of the virtual fluid substance 40 when the virtual fluid substance encounters the virtual obstacle 30 is simulated, thereby simulating a more realistic diffusion effect of the virtual fluid substance 40. In this way, user experience is improved.

Figure 3:
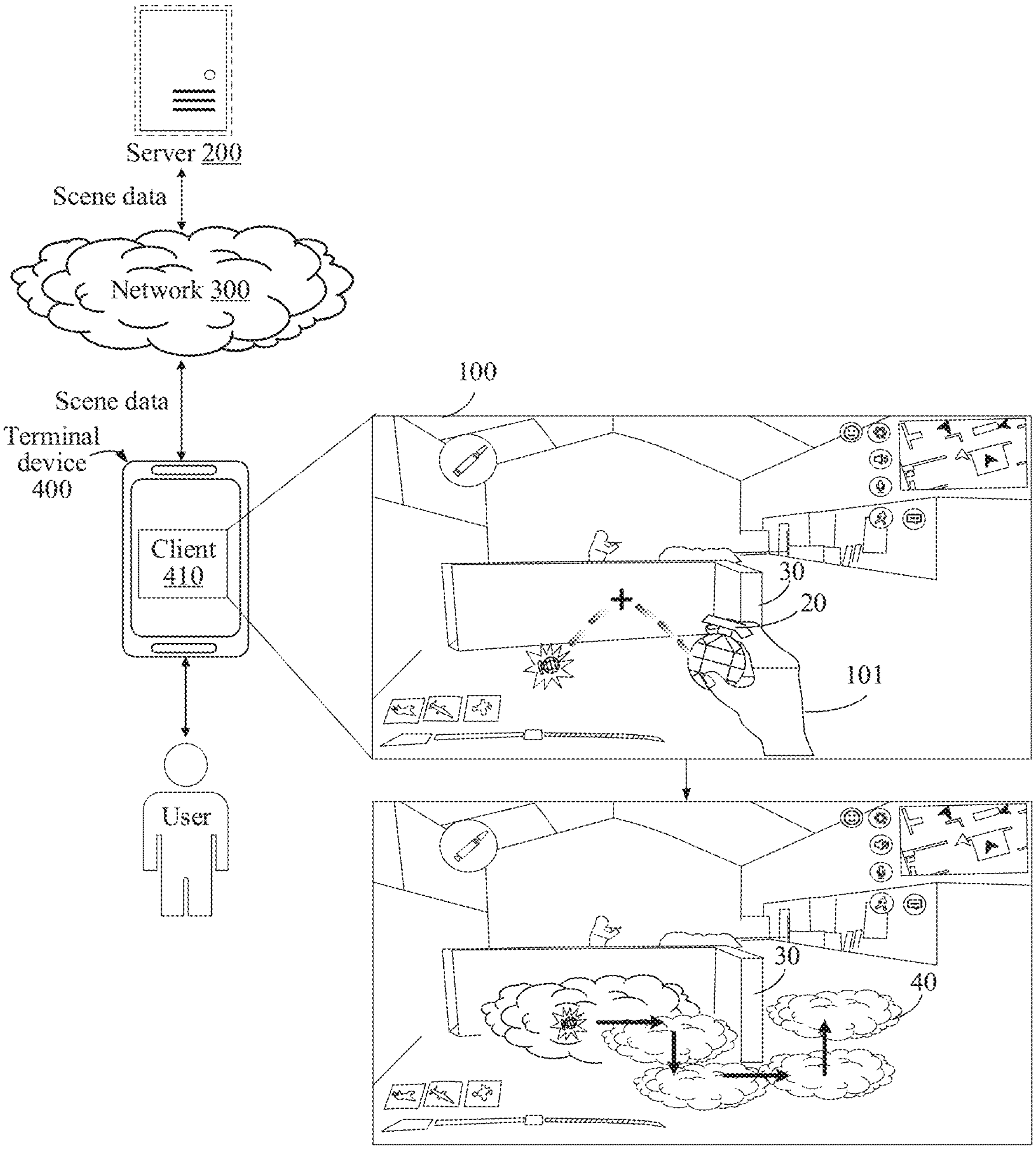
FIG. 3 is a schematic diagram of an application mode of a method for controlling a virtual throwable according to an exemplary embodiment of this application.

In another implementation scenario, FIG. 3 is a schematic diagram of an application mode of a method for controlling a virtual throwable according to an exemplary embodiment of this application. The method is applied to a terminal device 400 and a server 200, and is applicable to an application mode in which calculation of a virtual scene is completed through a computing capability of the server 200 and the virtual scene is outputted at the terminal device 400.

An example in which visual sensing of the virtual scene 100 needs to be formed is used. The server 200 calculates display data (such as scene data) related to the virtual scene and transmits the display data to the terminal device 400 through a network 300. The terminal device 400 completes loading, parsing, and rendering of the calculated display data through graphics computing hardware, and outputs the virtual scene through graphics output hardware to form the visual sensing. For example, a 2D video frame may be presented on a display of a smartphone, or a 3D video frame is projected onto lenses of AR/VR glasses. The sensing in the form of the virtual scene may be outputted through corresponding hardware of the terminal device 400. For example, auditory sensing is formed by using a microphone, and haptic sensing is formed by using a vibrator.

In an example, the terminal device 400 has a client 410 (for example, an online game APP) running therein, and performs game interactions with other users through connection to the server 200 (for example, a game server), and the terminal device 400 outputs a virtual scene 100 of the client 410. An example in which the virtual scene 100 is displayed from a third-person perspective is used. A primary controlled virtual object 101 is displayed in the virtual scene 100. The primary controlled virtual object 101 may be a user-controlled game role, i.e., the primary controlled virtual object 101 is controlled by a real user, and is to move in the virtual scene 100 in response to an operation performed by the real user on a controller (such as a touchscreen, a voice-operated switch, a keyboard, a mouse, or a joystick). For example, when the real user moves the joystick rightward, the primary controlled virtual object 101 moves rightward in the virtual scene 100, or may keep still or jump, and the primary controlled virtual object 101 is controlled to perform a shooting operation and the like.

For example, the primary controlled virtual object 101 is displayed in the virtual scene 100. In response to a thrown virtual throwable 20 exploding in the virtual environment 100, a diffusive virtual fluid substance 40 released by the virtual throwable 20 is displayed. In response to the virtual fluid substance 40 encountering a virtual obstacle 30 during diffusion, a diffusion direction of the virtual fluid substance 40 is changed based on the virtual obstacle 30. Through the changing of the diffusion direction of the virtual fluid substance 40 based on the virtual obstacle 30, a realistic scenario of changing the direction of the virtual fluid substance 40 when the virtual fluid substance encounters the obstacle is simulated, thereby simulating a more realistic diffusion effect of the virtual fluid substance. In this way, user experience is improved.

In some embodiments, the terminal device 400 may implement the method for controlling a virtual throwable in a virtual scene provided in the embodiments of this application by running a computer program. For example, the computer program may be a native program or a software module in an operating system; or may be a native APP, i.e., a program that needs to be installed in the operating system for running, such as a shooting game APP (i.e., the above client 410); or may be an applet, i.e., a program that merely needs to be downloaded into a browser environment for running; or may be a game applet that can be embedded into any APP. In a word, the above computer program may be an APP, a module, or a plug-in in any form.

An example in which the computer program is an APP is used. During an actual implementation, the terminal device 400 has an APP supporting a virtual scene installed and running therein. The APP may be any one of a first-person shooting game (FPS), a third-person shooting game (TPS), an escape shooting game, a VR APP, an AR program, a 3D map program, a MOBA game, and a simulation game (SLG). A user operates a virtual object in the virtual scene by using the terminal device 400, to perform an activity. The activity includes but is not limited to at least one of adjusting a body posture, crawling, walking, running, riding, jumping, driving, pickup, shooting, attacking, throwing, and building a virtual building. Exemplarily, the virtual object may be a virtual character, such as a simulated character or a cartoon character.

In some other embodiments, this embodiment of this application may be implemented through a cloud technology. The cloud technology is a hosting technology that unifies a series of resources such as hardware, software, and a network in a wide area network or a local area network to realize data computing, storage, processing, and sharing.

The cloud technology is a collective name of a network technology, an information technology, an integration technology, a platform management technology, an application technology, and the like based on application of business models for cloud computing. The technologies may form a resource pool for use on demand, which is flexible and convenient. A cloud computing technology will become an important support. Backend services of a technological network system require a lot of computing and storage resources.

For example, the server 200 in FIG. 3 may be an independent physical server, or may be a server cluster formed by a plurality of physical servers or a distributed system, or may be a cloud server providing basic cloud computing services such as a cloud service, a cloud database, cloud computing, a cloud function, cloud storage, a network service, cloud communication, a middleware service, a domain name service, a security service, a big data platform, and an artificial intelligence (AI) platform. The terminal device 400 may be a smartphone, a tablet computer, a notebook computer, a desktop computer, a smart speaker, a smart watch, or the like, but is not limited thereto. The terminal device 400 and the server 200 may be directly or indirectly connected through wired or wireless communication, which is not limited in this embodiment of this application.

Figure 4:
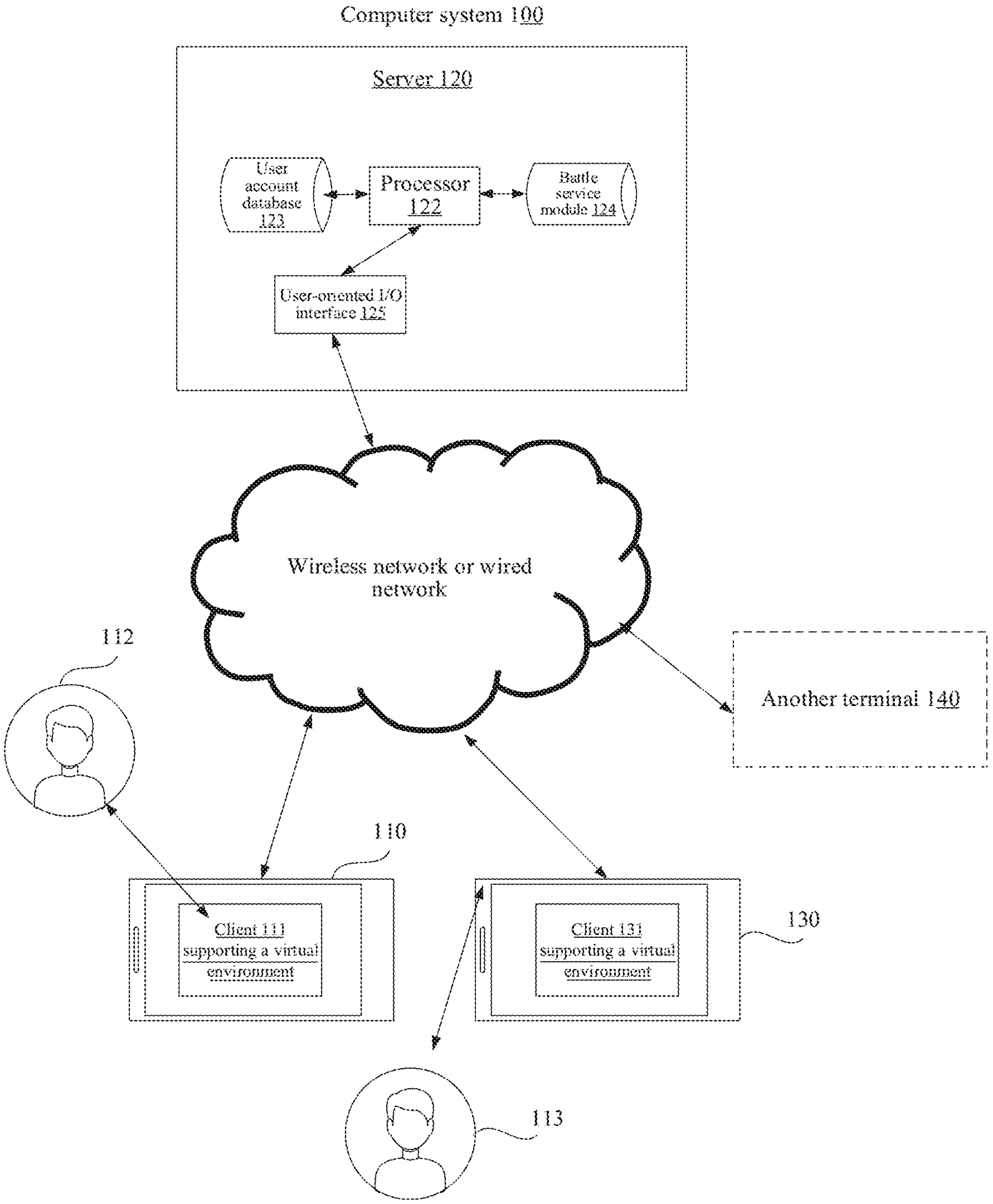
FIG. 4 is a structural block diagram of a computer system according to an exemplary embodiment of this application.

FIG. 4 is a structural block diagram of a computer system 100 according to an exemplary embodiment of this application. The computer system 100 includes a first terminal 110, a server 120, and a second terminal 130.

The first terminal 110 has a client 111 supporting a virtual environment installed and running therein. The client 111 may be a multiplayer online battle program. When the client 111 runs in the first terminal 110, a UI of the client 111 is displayed on a screen of the first terminal 110. The client 111 may be any one of an escape shooting game, a VR APP, an AR program, a 3D map program, a VR game, an AR game, an FPS, a TPS, a MOBA game, and an SLG. In this embodiment, a description is provided by using an example in which the client 111 is a shooting game.

The first terminal 110 is a terminal used by a first user 112. The first user 112 controls a first virtual object in the virtual environment to perform an activity or operates a virtual item owned by the first virtual object by using the first terminal 110. The first virtual object may be referred to as a virtual object of the first user 112. The first user 112 may perform an operation such as assembling, disassembling, or unloading on the virtual item owned by the first virtual object, which is not limited in this application. Exemplarily, the first virtual object is a first virtual character, for example, a simulated character or a cartoon character.

The second terminal 130 has a client 131 supporting a virtual environment installed and running therein. The client 131 may be a multiplayer online battle program. When the second client 131 runs in the second terminal 130, a UI of the second client 131 is displayed on a screen of the second terminal 130. The client may be any one of an escape shooting game, a VR APP, an AR program, a 3D map program, a VR game, an AR game, an FPS, a TPS, a MOBA game, and an SLG. In this embodiment, a description is provided by using an example in which the client 131 is a MOBA game.

The second terminal 130 is a terminal used by a second user 113. The second user 113 controls a second virtual object in the virtual environment to perform an activity or operates a virtual item owned by the second virtual object by using the second terminal 130. The second virtual object may be referred to as a virtual object of the second user 113. Exemplarily, the second virtual object is a second virtual character, for example, a simulated character or a cartoon character.

In some embodiments, the first virtual object and the second virtual object are in the same virtual environment. In some embodiments, the first virtual object and the second virtual object may belong to the same camp, the same team, or the same organization, or may be friends, or may have temporary communication permission. In some embodiments, the first virtual object and the second virtual object may belong to different camps, different teams, or different organizations, or may be rivals.

In some embodiments, the client installed in the first terminal 110 is same as the client installed in the second terminal 130, or the clients installed in the two terminals are clients of the same type on different operating system platforms (Android or IOS). The first terminal 110 may be one of a plurality of terminals, and the second terminal 130 may be another of the plurality of terminals. In this embodiment, only the first terminal 110 and the second terminal 130 are used as an example for description. The first terminal 110 and the second terminal 130 are of the same device type or different device types. The device type includes at least one of a smartphone, a tablet computer, an e-book reader, a moving picture experts group audio layer III (MP3) player, a moving picture experts group audio layer IV (MP4) player, a laptop portable computer, and a desktop computer.

FIG. 4 shows only two terminals. However, in a different embodiment, a plurality of other terminals 140 exist and may be connected to the server 120. In some embodiments, one or more other terminals 140 corresponding to a developer exist. A development and editing platform of a client supporting a virtual environment is installed on each of the other terminals 140. The developer may edit and update the client on the other terminals 140, and transmit an updated client installation package to the server 120 through a wired or wireless network. The first terminal 110 and the second terminal 130 may download the client installation package from the server 120 to update the client.

The first terminal 110, the second terminal 130, and the other terminals 140 are connected to the server 120 through a wired or wireless network.

The server 120 includes at least one of one server, a plurality of servers, a cloud computing platform, and a virtualization center. The server 120 is configured to provide a backend service for a client supporting a 3D virtual environment. In some embodiments, the server 120 is in charge of primary computing works, and the terminals are in charge of secondary computing works. Alternatively, the server 120 is in charge of the secondary computing works, and the terminals are in charge of the primary computing works. Alternatively, the server 120 and the terminals perform collaborative computing through a distributed computing architecture.

In an exemplary example, the server 120 includes a processor 122, a user account database 123, a battle service module 124, and a user-oriented input/output interface (I/O interface) 125. The processor 122 is configured to load instructions stored in the server 121, and process data in the user account database 123 and the battle service module 124. The user account database 123 is configured to store data of user accounts used by the first terminal 110, the second terminal 130, and the other terminals 140, for example, avatars of the user accounts, nicknames of the user accounts, combat effectiveness indices of the user accounts, and service regions where the user accounts are located. The battle service module 124 is configured to provide a plurality of battle rooms for users to battle, for example, a 1V1 battle, a 3V3 battle, or a 5V5 battle. The user-oriented I/O interface 125 is configured to establish communication with the first terminal 110 and/or the second terminal 130 through the wireless or wired network to exchange data.

The method for controlling a virtual throwable provided in the embodiments of this application is described below.

Figure 5:
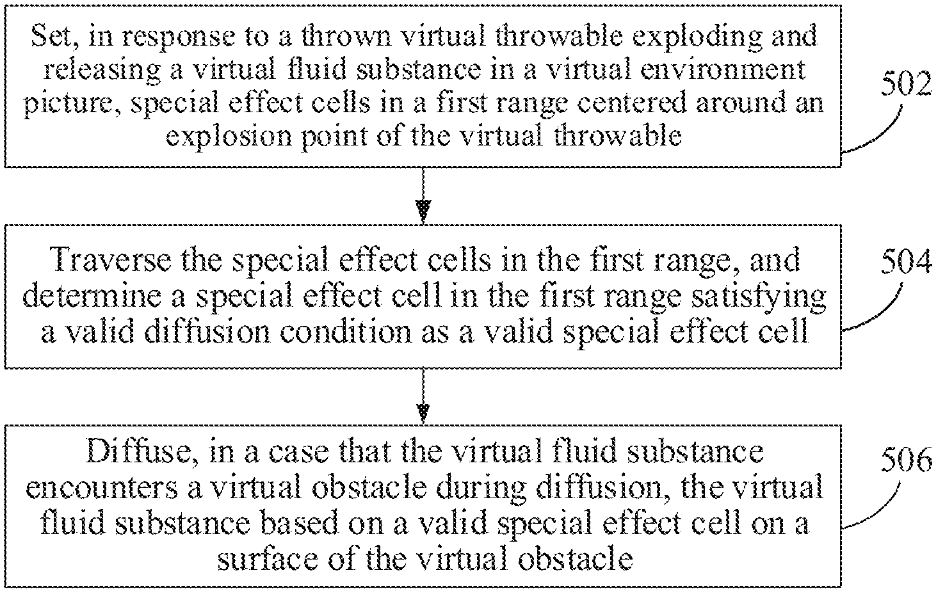
FIG. 5 is a flowchart of a method for controlling a virtual throwable according to an exemplary embodiment of this application.

FIG. 5 is a flowchart of a method for controlling a virtual throwable according to an exemplary embodiment of this application. The method may be performed by a computer device. The computer device may be the terminal or the server shown in FIG. 4. The method includes the following operations:

Operation 502: Set, in response to a thrown virtual throwable exploding and releasing a virtual fluid substance in a virtual environment picture, special effect cells in a first range centered around an explosion point of the virtual throwable.

A virtual environment is a virtual activity space provided by an APP in a terminal during running, for a virtual object to perform various activities in the virtual activity space.

Exemplarily, the virtual environment is a 2D picture displayed on the terminal obtained through picture capturing of a 3D virtual environment. Exemplarily, a shape of the virtual environment is determined based on a shape of a display of the terminal or a shape of a UI of the terminal. For example, the display of the terminal is rectangular. In this case, the virtual environment picture is displayed as a rectangular picture.

The virtual object is a game role controlled by the terminal. The terminal controls the virtual object to move in the virtual environment based on a received user operation.

Exemplarily, activities of the virtual object in the virtual environment includes walking, running, jumping, climbing, getting down, attacking, releasing a skill, picking up a prop, transmitting a message, and the like, which are not limited in this embodiment of this application.

The virtual throwable refers to a virtual item that can be thrown by the virtual object in the virtual environment.

In some embodiments, the virtual throwable includes at least one of a virtual smoke bomb, a virtual frangible grenade, a virtual gas bottle, and the like, which is not limited in this embodiment of this application.

The virtual fluid substance refers to a virtual fluid substance with a fluid property released by the virtual throwable. The virtual fluid substance has diffusivity. If a virtual smoke bomb is used as an example, the virtual fluid substance refers to smoke released by the virtual smoke bomb.

Exemplarily, the computer device sets the special effect cells in the first range centered around the explosion point of the virtual throwable, the special effect cells being configured for determining a diffusion direction of the virtual fluid substance, and the first range being greater than a second range, the second range indicating a diffusion range of the virtual fluid substance.

Operation 504: Traverse the special effect cells in the first range, and determine a special effect cell in the first range satisfying a valid diffusion condition as a valid special effect cell.

Exemplarily, a manner of throwing the virtual throwable includes at least one of a high throw, a low throw, and a rebound from impact of the virtual throwable, which is not limited in this application. In other words, the virtual throwable may be thrown through at least one of the high throw, the low throw, and the rebound from impact.

In some embodiments, throwing the virtual throwable through the high throw means throwing the virtual throwable upward. In other words, an initial throwing direction of the virtual throwable is an upward throwing direction. Throwing the virtual throwable through the low throw means throwing the virtual throwable downward. In other words, the initial throwing direction of the virtual throwable is a downward throwing direction. Throwing the virtual throwable through the rebound from impact means throwing the virtual throwable toward an obstacle. In other words, the initial throwing direction of the virtual throwable is a direction toward the virtual throwable. The virtual throwable rebounds and switches to another direction when touching the obstacle.

Exemplarily, the computer device traverses the special effect cells in the first range, and determines the special effect cell in the first range satisfying the valid diffusion condition as a valid special effect cell.

The valid diffusion condition includes at least one of the special effect cell being in the second range, the special effect cell not overlapping the virtual obstacle, and the special effect cell being not traversed. In some embodiments, the valid diffusion condition includes all of the special effect cell being in the second range, the special effect cell not overlapping the virtual obstacle, and the special effect cell being not traversed.

Operation 506: Diffuse, when the virtual fluid substance encounters a virtual obstacle during diffusion, the virtual fluid substance based on a valid special effect cell on a surface of the virtual obstacle.

Exemplarily, in response to the virtual fluid substance encountering the virtual obstacle during diffusion, the computer device changes the diffusion direction of the virtual fluid substance based on the virtual obstacle.

A virtual smoke bomb is used as an example. After the virtual smoke bomb releases smoke, the smoke diffuses all around. During the diffusion, the smoke encounters a wall. The wall changes the diffusion direction of the smoke, so that the smoke diffuses in a direction of the wall.

Exemplarily, the computer device diffuses, when the virtual fluid substance encounters the virtual obstacle during the diffusion, the virtual fluid substance based on the valid special effect cell on the surface of the virtual obstacle.

In summary, according to the method provided in this embodiment of this application, the computer device sets the special effect cells in the first range centered around the explosion point of the virtual throwable in response to the thrown virtual throwable exploding and releasing the virtual fluid substance in the virtual environment picture; traverses the special effect cells in the first range, and determines the special effect cell in the first range satisfying the valid diffusion condition as a valid special effect cell; and diffuses, when the virtual fluid substance encounters the virtual obstacle during the diffusion, the virtual fluid substance based on the valid special effect cell on the surface of the virtual obstacle. According to this application, through the detection of the valid special effect cells around the virtual obstacle and the diffusion based on the valid special effect cells around the virtual obstacle, a realistic scenario of changing the direction of the virtual fluid substance when the virtual fluid substance encounters the obstacle is simulated, thereby simulating a more realistic diffusion effect of the virtual fluid substance.

Figure 6:
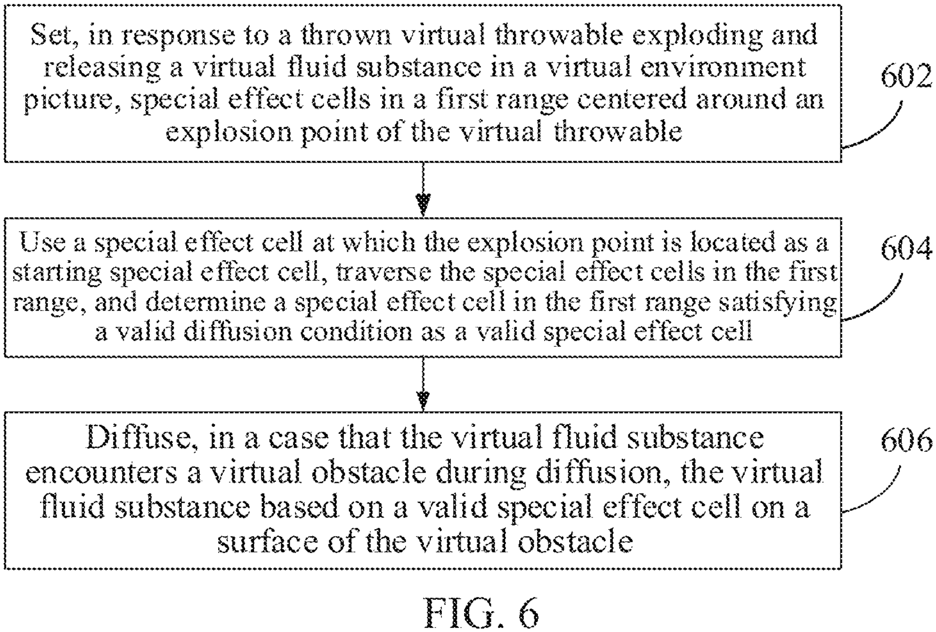
FIG. 6 is a flowchart of a method for controlling a virtual throwable according to an exemplary embodiment of this application.

FIG. 6 is a flowchart of a method for controlling a virtual throwable according to an exemplary embodiment of this application. The method may be performed by a computer device. The computer device may be the terminal or the server shown in FIG. 4. The method includes the following operations:

Operation 602: Set, in response to a thrown virtual throwable exploding and releasing a virtual fluid substance in a virtual environment picture, special effect cells in a first range centered around an explosion point of the virtual throwable.

A virtual environment is a virtual activity space provided by an APP in a terminal during running, for a virtual object to perform various activities in the virtual activity space.

Exemplarily, a position of the virtual object in the virtual environment may be equivalent to a central position in a map display control, or may be another position in the map display control. In other words, the position of the virtual object in the virtual environment may correspond to a center of the map display control, or may correspond to another position in the map display control.

The virtual throwable refers to a virtual item that can be thrown by the virtual object in the virtual environment.

In some embodiments, the virtual throwable includes at least one of a virtual smoke bomb, a virtual frangible grenade, a virtual gas bottle, and the like, which is not limited in this embodiment of this application.

The virtual fluid substance refers to a virtual fluid substance with a fluid property released by the virtual throwable. The virtual fluid substance has diffusivity. If a virtual smoke bomb is used as an example, the virtual fluid substance refers to smoke released by the virtual smoke bomb.

Exemplarily, a manner of throwing the virtual throwable includes at least one of a high throw, a low throw, and a rebound from impact of the virtual throwable, which is not limited in this application. In other words, the virtual throwable may be thrown through at least one of the high throw, the low throw, and the rebound from impact.

Figure 7:
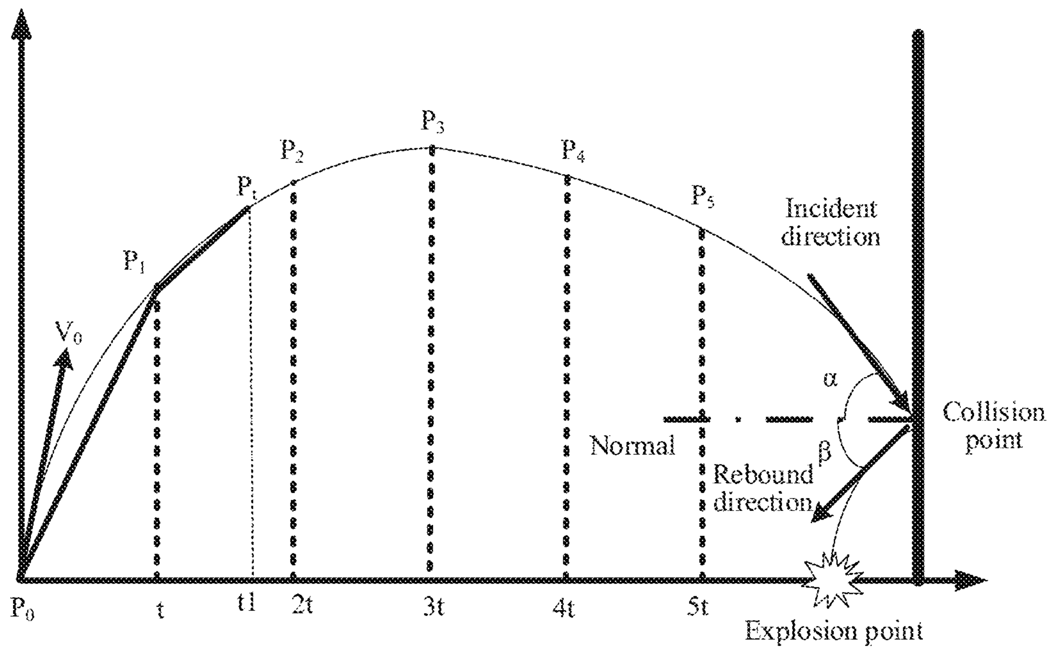
FIG. 7 is a schematic diagram of a throwing trajectory of a virtual throwable according to an exemplary embodiment of this application.

FIG. 7 is a schematic diagram of a throwing trajectory of a virtual throwable. Initial position information of the virtual throwable is $P_0$, and a throwing speed is $V_0$. The computer device calculates the throwing trajectory of the virtual throwable through a parabolic algorithm, and obtains a rebound point and a final explosion point based on the throwing trajectory. n sample points may be selected from the throwing trajectory. n is an integer greater than 1. Position information of the sample points may be calculated by using the following equations:

$P_1=P_0+V_0*t.$ Position information of a first sample point $P_1$:

$P_2=P_1+V_1*t.$ Position information of a second sample point $P_2$:

Position information of a sample point Pt between the first sample point and the second sample point:

$$P_t = P_1 + (P_2 - P_1)\frac{t1 - t}{t}.$$

In the equations, t is a unit time, $V_1$ is throwing speed information at the first sample point, and t1 is a time point corresponding to the sample point Pt between the second sample point and the first sample point.

Operation 604: Use a special effect cell at which the explosion point is located as a starting special effect cell, traverse the special effect cells in the first range, and determine a special effect cell in the first range satisfying a valid diffusion condition as a valid special effect cell.

Exemplarily, the computer device uses the special effect cell at which the explosion point is located as the starting special effect cell. The computer device traverses special effect cells adjacent to the starting special effect cell, determines a special effect cell that is adjacent to the starting special effect cell and satisfies the valid diffusion condition as a valid special effect cell, and determines the special effect cell as a next starting special effect cell; and repeats the above operation until all of the special effect cells in the first range are traversed.

Figure 8:
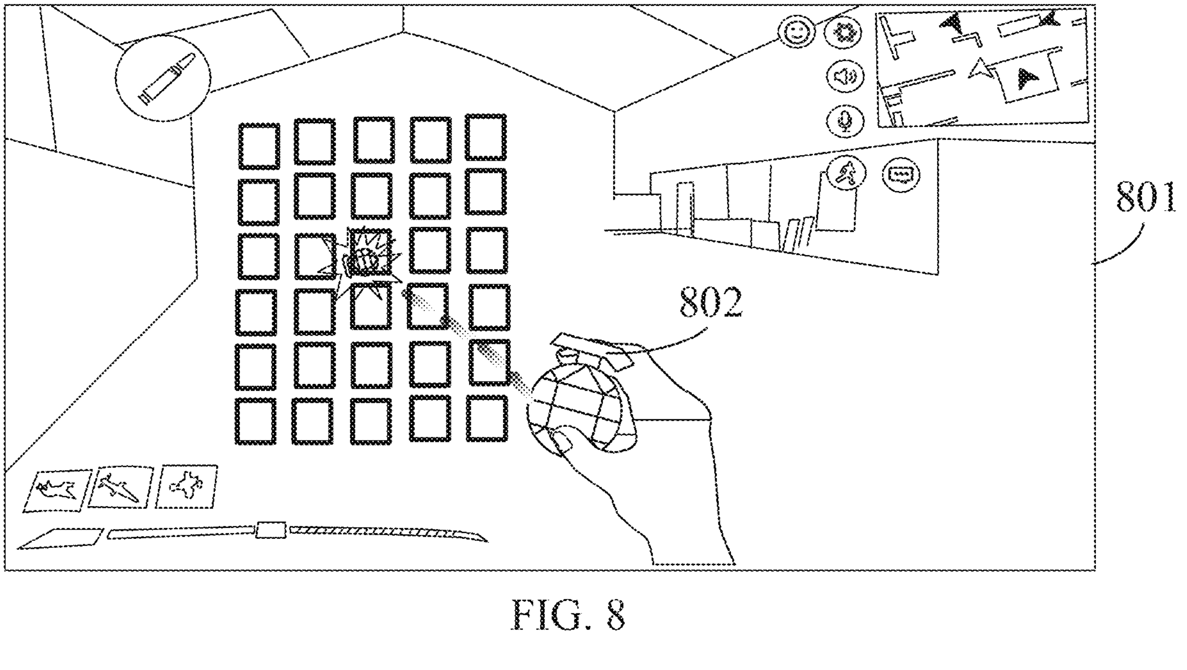
FIG. 8 is a schematic diagram of setting special effect cells centered around explosion point according to an exemplary embodiment of this application.

For example, FIG. 8 is a schematic diagram of setting special effect cells around an explosion point which is a center. A virtual environment picture 801 is displayed on a UI. In response to a thrown virtual throwable 802 exploding in the virtual environment picture 801, the computer device sets special effect cells in a first range centered around an explosion point of the virtual throwable 802. The first range is a preset range centered around the explosion point of the virtual throwable.

In some embodiments, a shape of the first range is at least one of a rectangular cuboid, a cube, a circle, a sphere, a cylinder, and the like, which is not specifically limited in this embodiment of this application.

Figure 9:
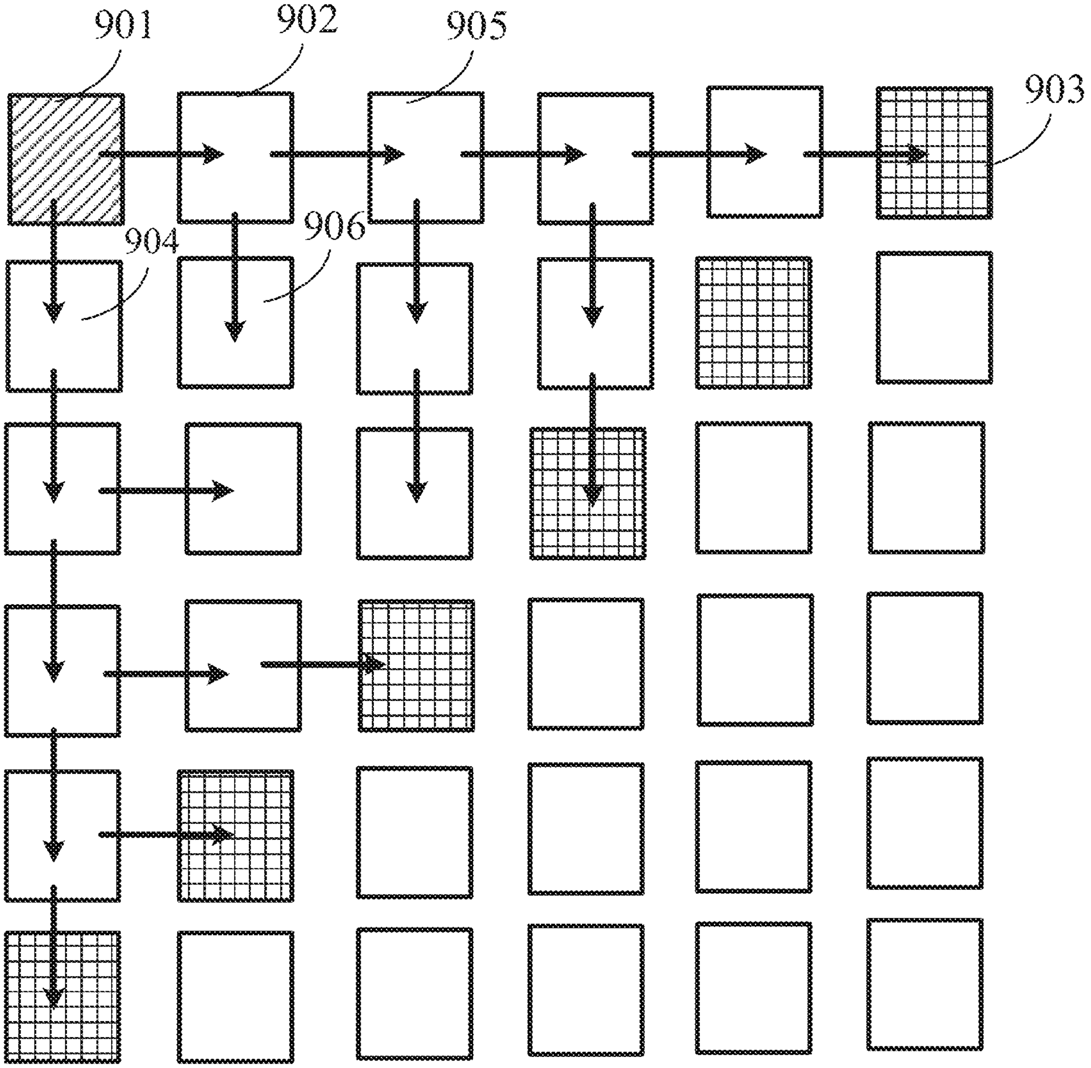
FIG. 9 is a schematic diagram of traversing special effect cells according to an exemplary embodiment of this application.

Exemplarily, FIG. 9 is a schematic diagram of traversing special effect cells. Cells in a 6*6 2D special effect grid are used as an example. A first special effect cell at an upper left corner of FIG. 9 is used as a starting special effect cell 901. Special effect cells adjacent to the starting special effect cells 901 are traversed starting from the starting special effect cell 901. Specifically, a special effect cell 902 adjacent to the starting special effect cell 901 in a horizontal direction and a special effect cell 904 adjacent to the starting special effect cell 901 in a vertical direction are traversed. Assuming that the special effect cell 902 satisfies the valid diffusion condition, the special effect cell 902 of the special effect cells adjacent to the starting special effect cell 901 satisfying the valid diffusion condition is determined as a valid special effect cell, and the determined valid special effect cell 902 adjacent to the starting special effect cell 901 is determined as a new starting special effect cell 902. Special effect cells adjacent to the new starting special effect cell 902 are further traversed. Specifically, a special effect cell 905 adjacent to the new starting special effect cell 902 in a horizontal direction (the special effect cell 901 adjacent to the new starting special effect cell 902 has been traversed, and therefore does not need to be traversed again) and a special effect cell 906 adjacent to the new starting special effect cell 902 in a vertical direction are traversed. The above operation is repeated until no new valid special effect cell exists, or until a special effect cell 903 at an edge is traversed, or until all of the special effect cells are traversed.

Figure 10:
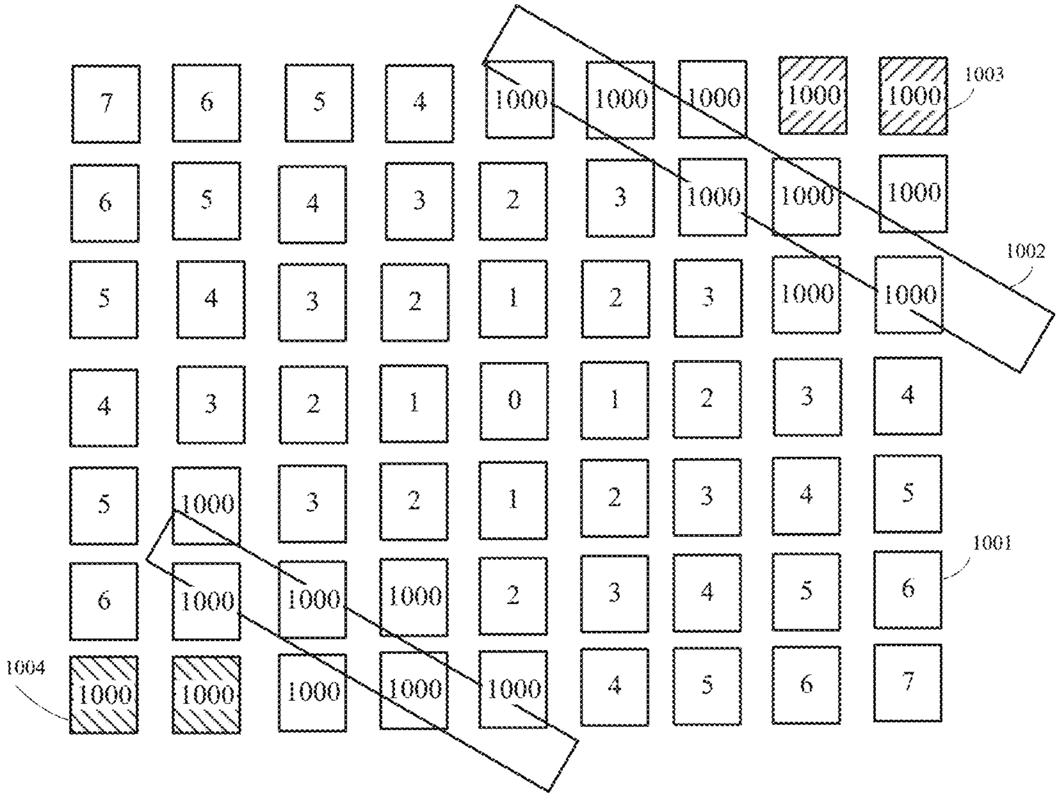
FIG. 10 is a schematic diagram of traversing special effect cells according to an exemplary embodiment of this application.

In some embodiments, FIG. 10 is a schematic diagram of traversing special effect cells. Cells in a 9*7 2D special effect grid are used as special effect cells 1001 in the first range. A box in FIG. 10 is configured for representing a virtual obstacle 1002. A special effect cell at a fourth row and a fifth column is used as a center cell. In other words, the center cell is used as the explosion point of the virtual throwable. In an initial case, a distance value of the center cell is set to 0, and a distance between another special effect cell and the center cell is set to 1000 by default. The special effect cells 1001 in the first range are traversed. The center cell is used as a starting point, to calculate a Manhattan distance of each special effect cell 1001 adjacent to the center cell, i.e., the special effect cells 1001 adjacent to the center cell are traversed. When the special effect cells 1001 are in a second range, the special effect cells 1001 do not overlap the virtual obstacle 1002, and the special effect cells 1001 are not traversed, the special effect cells 1001 are determined as valid special effect cells, and distance values thereof are added by one. The determined valid special effect cell adjacent to the center cell is used as a new center cell, and special effect cells 1001 adjacent to the new center cell are traversed. The above operation is repeated until no valid special effect cell exists. FIG. 10 shows first shaded special effect cells 1003 at an upper right corner. Since the first shaded special effect cells 1003 are obstructed by the virtual obstacle 1002, the first shaded special effect cells 1003 cannot be traversed. Therefore, the first shaded special effect cells 1003 are determined as invalid special effect cells, and distances thereof are still 1000 by default. FIG. 10 shows second shaded special effect cells 1004 at a lower left corner. Since the special effect cells 1004 are not in the second range, it is determined that the second shaded special effect cells 1004 are invalid special effect cells, and distances thereof are still 1000 by default. For example, a distance value corresponding to the second range is 6, and Manhattan distances respectively corresponding to the second shaded special effect cells 1004 are 7 and 8. Therefore, the second shaded special effect cells 1004 in the lower left corner are all invalid special effect cells.

Figure 11:
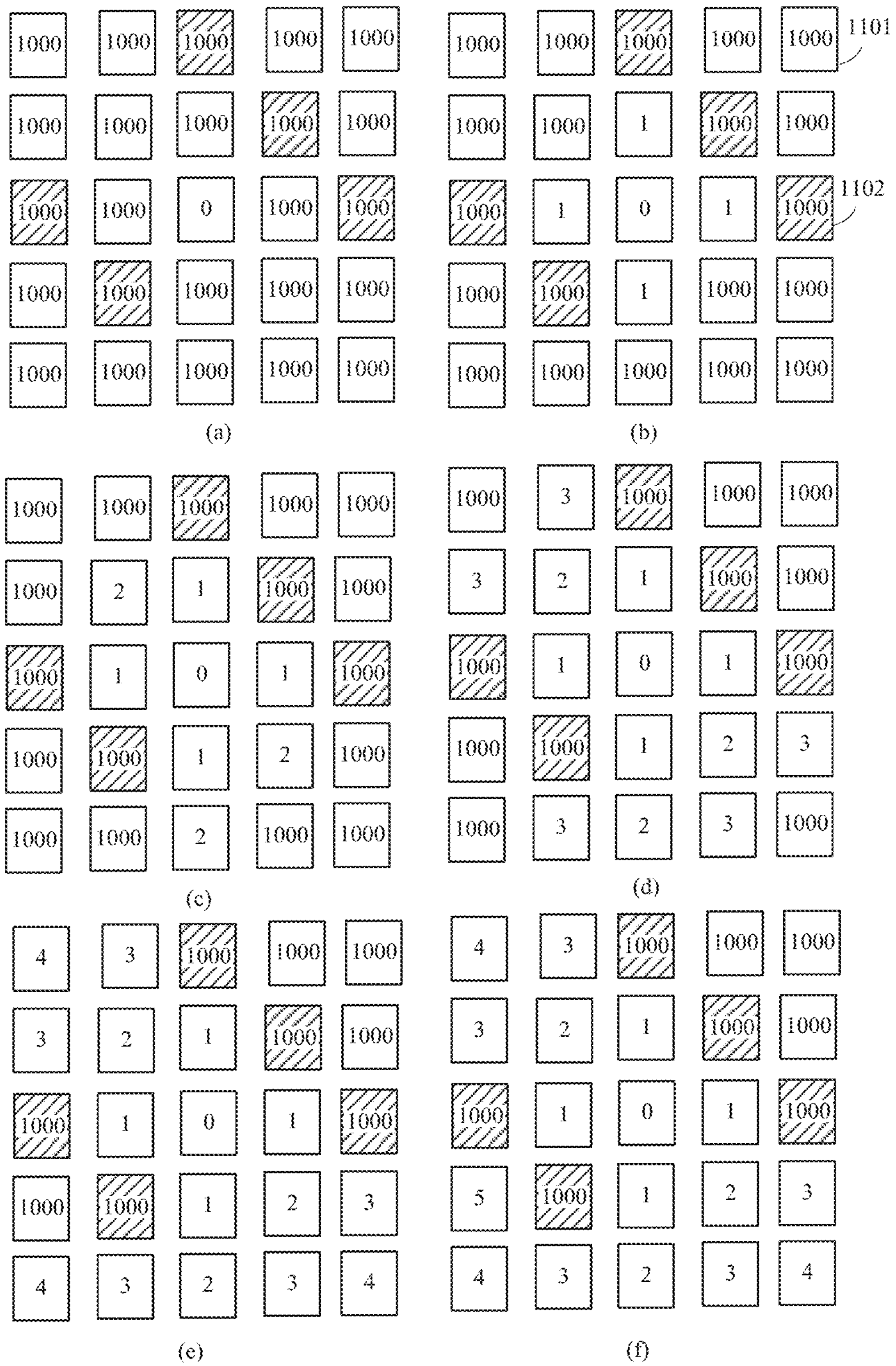
FIG. 11 is a schematic diagram of stepwise traversal of special effect cells according to an exemplary embodiment of this application.

To understand the process of traversing the special effect cells in more detail, FIG. 11 is a schematic diagram of stepwise traversal of special effect cells. Cells in a 5*5 2D special effect grid are used as special effect cells 1101 in the first range. A shaded special effect cell in FIG. 11 is configured for representing an invalid special effect cell 1102. A special effect cell 1101 at a third row and a third column is used as a center cell. The center cell is used as the explosion point of the virtual throwable. In an initial case, as shown in (a) in FIG. 11, a distance value of the center cell is set to 0, and a distance between another special effect cell and the center cell is set to 1000 by default. Special effect cells 1101 in the first range are traversed. As shown in (b) in FIG. 11, the center cell is used as a starting point, to calculate a Manhattan distance of each special effect cell 1101 adjacent to the center cell, i.e., the special effect cells 1101 adjacent to the center cell in four directions are traversed. Since the special effect cells 1101 adjacent to the center cell in the four directions are in the second range, the special effect cells 1101 do not overlap the virtual obstacle, and the special effect cells 1101 are not traversed, the special effect cells 1101 are determined as valid special effect cells, and distance values thereof are added by one.

As shown in (c) in FIG. 11, valid special effect cells with a distance value of one from the center cell is used as new center cells, to traverse special effect cells adjacent to the new center cells. The special effect cells adjacent to the new center cells are determined as valid special effect cells, and distance values thereof are changed from one to two.

As shown in (d) in FIG. 11, valid special effect cells with a distance value of two from the center cell are used as new center cells, to traverse special effect cells adjacent to the new center cells. The special effect cells adjacent to the new center cell are determined as valid special effect cells, and distance values thereof are changed from two to three.

As shown in (e) in FIG. 11, valid special effect cells with a distance value of three from the center cell are used as new center cells, to traverse special effect cells adjacent to the new center cells. The special effect cells adjacent to the new center cells are determined as valid special effect cells, and distance values thereof are changed from three to four.

As shown in (f) in FIG. 11, valid special effect cells with a distance value of four from the center cell is used as new center cells, to traverse special effect cells adjacent to the new center cells. The special effect cells adjacent to the new center cells are determined as valid special effect cells, and distance values thereof are changed from four to five.

The above operation is repeated until no new valid special effect cell exists or until all of the special effect cells in the first range are traversed.

During the above cell traversal, the valid special effect cell is identified through marking of the distance between the special effect cell and the center cell. When the distance value is less than 1000, the special effect cell is determined as a valid special effect cell. In a possible implementation, a valid special effect cell may be marked with an empty tag. To be specific, a valid special effect cell may be marked as "empty", and an invalid special effect cell may be marked as "solid". It is determined whether a special effect cell is valid through identification of a mark of the special effect cell.

Operation 606: Diffuse, when the virtual fluid substance encounters a virtual obstacle during diffusion, the virtual fluid substance based on a valid special effect cell on a surface of the virtual obstacle.

Exemplarily, in response to the virtual fluid substance encountering the virtual obstacle during diffusion, the computer device changes a diffusion direction of the virtual fluid substance based on the virtual obstacle.

A virtual smoke bomb is used as an example. After the virtual smoke bomb releases smoke, the smoke diffuses all around. During the diffusion, the smoke encounters a wall.

The wall changes the diffusion direction of the smoke, so that the smoke diffuses in a direction of the wall.

Exemplarily, the computer device sets the special effect cells in the first range centered around the explosion point of the virtual throwable, the special effect cells being configured for determining the diffusion direction of the virtual fluid substance, and the first range being greater than the second range, the second range indicating the diffusion range of the virtual fluid substance. The computer device traverses the special effect cells in the first range, and determines the special effect cell in the first range satisfying the valid diffusion condition as a valid special effect cell; and diffuses, when the virtual fluid substance encounters the virtual obstacle during the diffusion, the virtual fluid substance based on the valid special effect cell on the surface of the virtual obstacle.

The valid diffusion condition includes at least one of the special effect cell being in the second range, the special effect cell not overlapping the virtual obstacle, and the special effect cell being not traversed. In some embodiments, the valid diffusion condition includes all of the special effect cell being in the second range, the special effect cell not overlapping the virtual obstacle, and the special effect cell being not traversed.

Figure 12:
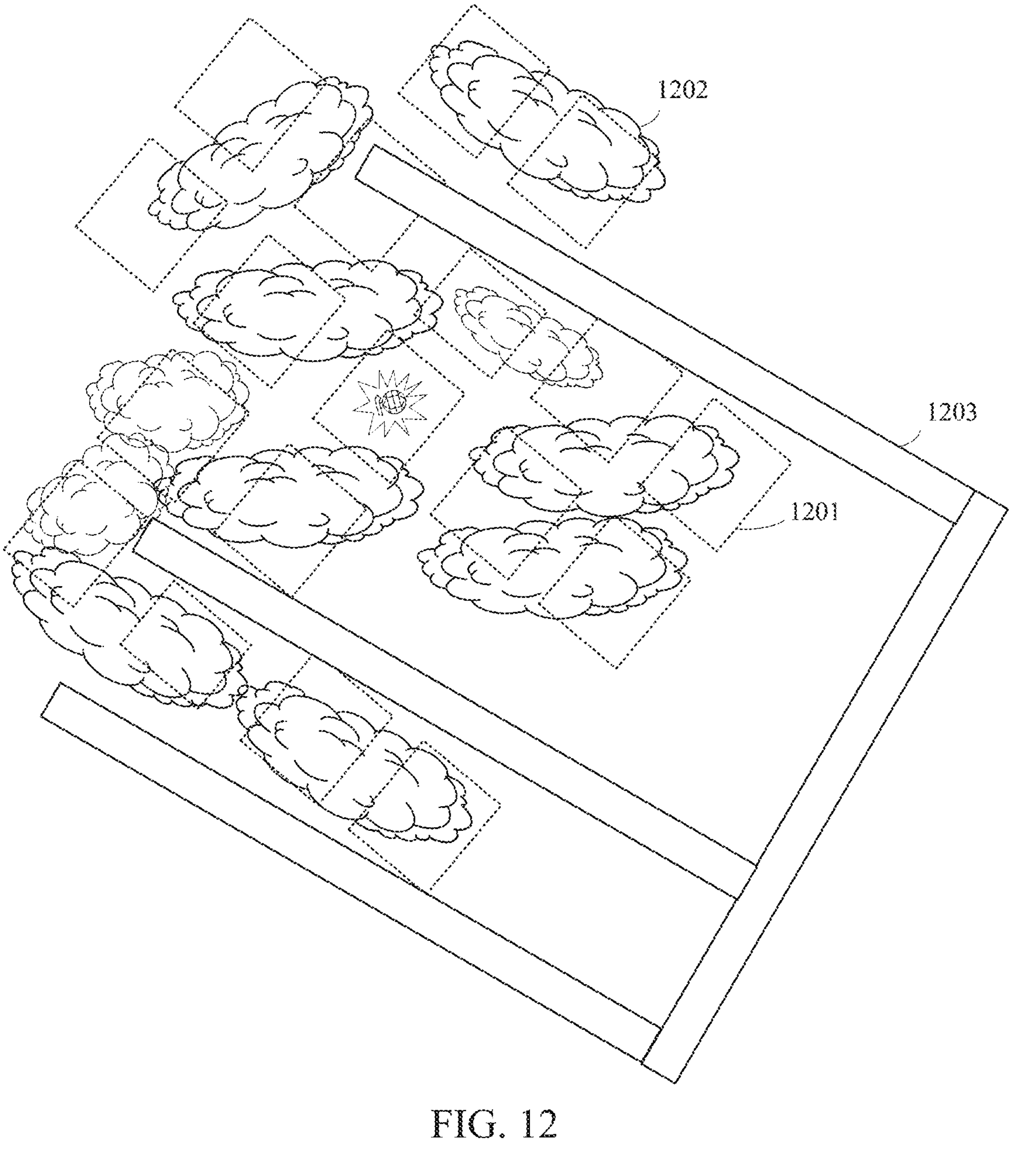
FIG. 12 is a schematic diagram of direction changing of a virtual fluid substance during diffusion according to an exemplary embodiment of this application.

Exemplarily, FIG. 12 is a schematic diagram of direction changing of a virtual fluid substance during diffusion. FIG. 12 shows a diffusion effect of a virtual fluid substance 1202 in a virtual obstacle 1203. A dashed-line box in FIG. 12 is configured for representing a valid special effect cell 1201, and a solid line frame is configured for representing a virtual obstacle 1203. As shown in FIG. 12, an example in which the virtual fluid substance 1202 is smoke is used. The smoke is diffused to another side of the virtual obstacle 1203 along the virtual obstacle 1203 without penetrating a wall. The diffusion is more in line with the real world.

In a possible implementation, when the special effect cell at which the explosion point is located is a valid special effect cell, the special effect cell at which the explosion point is located is used as the starting special effect cell.

The starting special effect cell refers to a special effect cell used as a starting point for traversal other special effect cells. In other words, the starting special effect cell is used as the starting point for traversing the other special effect cells.

In a possible implementation, when the special effect cell at which the explosion point is located is not a valid special effect cell, a special effect cell in the first range satisfying a ray detection condition is used as the starting special effect cell.

The ray detection condition includes that a to-be-detected special effect cell can be connected to the special effect cell at which the explosion point is located by a ray and that the to-be-detected special effect cell does not overlap the virtual obstacle.

Figure 13:
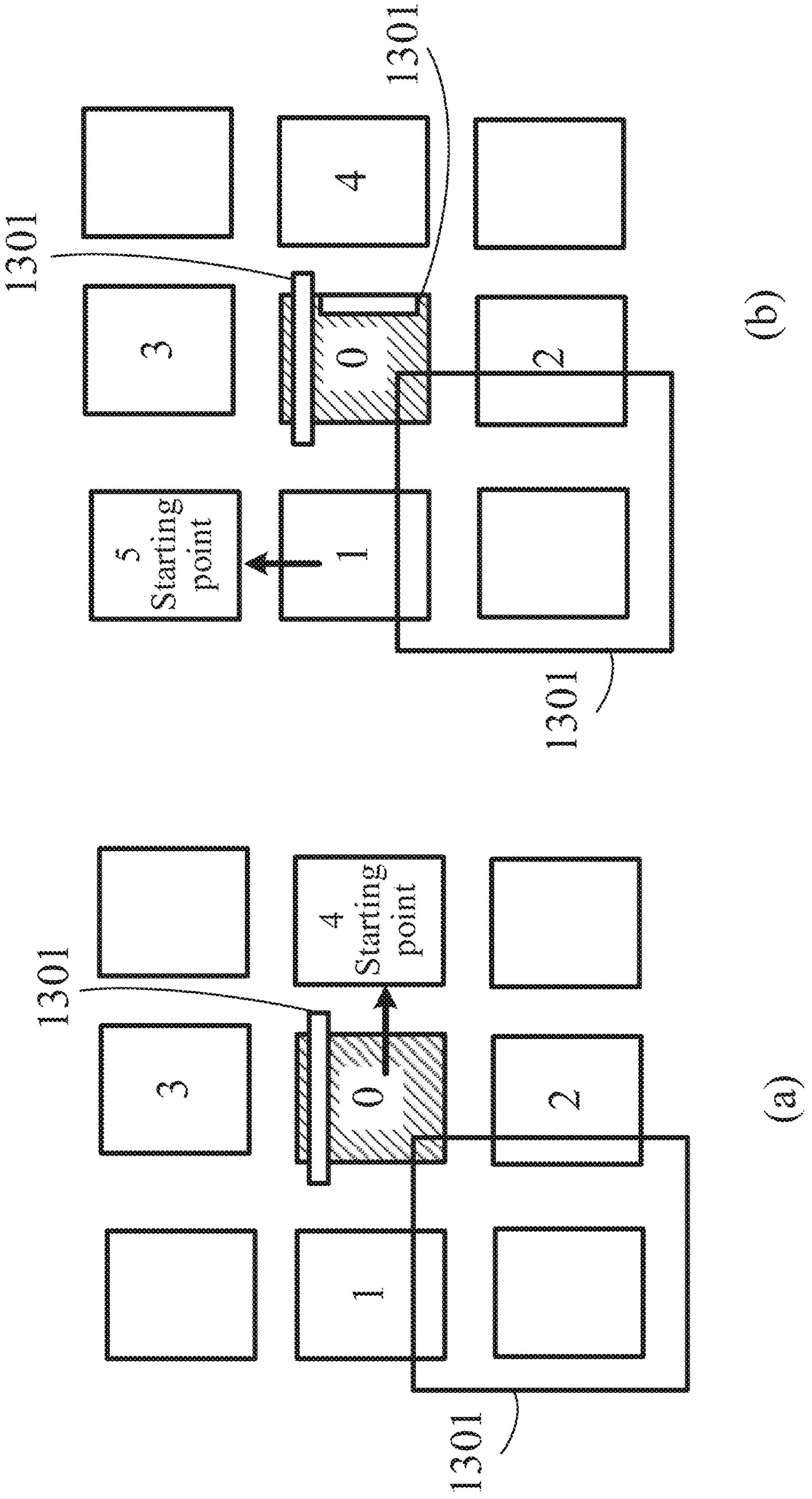
FIG. 13 is a schematic diagram of determining a starting special effect cell according to an exemplary embodiment of this application.

Exemplarily, FIG. 13 is a schematic diagram of determining a starting special effect cell. When the special effect cell at which the explosion point is located is not a valid special effect cell, the special effect cell cannot be used as the starting special effect cell, and another special effect cell needs to be selected as the starting special effect cell. A box in FIG. 13 is a virtual obstacle 1301, and a shaded special effect cell is a special effect cell at which the explosion point is located in an initial state. As shown in (a) in FIG. 13, the virtual obstacle 1301 overlaps the special effect cell at which the explosion point is located, and therefore the special effect cell cannot be used as the starting special effect cell. The shaded special effect cell is used as a center, to connect the shaded special effect cell to special effect cells 1, 2, 3, and 4 by a ray. Since the special effect cells 1 and 2 overlap the virtual obstacle 1301, the special effect cells 1 and 2 cannot be used as the starting special effect cell. Since the special effect cell 3 is obstructed by the virtual obstacle 1301, the special effect cell 3 cannot be connected to the shaded special effect cell by a ray, and therefore the special effect cell 3 cannot be used as the starting special effect cell. Since the special effect cell 4 can be connected to the shaded special effect cell by a ray, and the special effect cell 4 does not overlap the virtual obstacle 1301, the special effect cell 4 is determined as a new starting special effect cell.

As shown in (b) in FIG. 13, the virtual obstacle 1301 overlaps the special effect cell at which the explosion point is located, and therefore the special effect cell cannot be used as the starting special effect cell. The shaded special effect cell is used as a center, to connect the shaded special effect cell to special effect cells 1, 2, 3, and 4 by a ray. Since the special effect cells 1 and 2 overlap the virtual obstacle 1301, the special effect cells 1 and 2 cannot be used as the starting special effect cell. Since the special effect cells 3 and 4 are obstructed by the virtual obstacle 1301, the special effect cells 3 and 4 cannot be connected to the shaded special effect cell by a ray, and therefore the special effect cells 3 and 4 cannot be used as the starting special effect cell. Based on the above, the special effect cells 1, 2, 3, and 4 cannot be used as the starting special effect cell. Therefore, the special effect cells 1 and 2 which can be connected to the shaded special effect cell by a ray are selected as jump points. For example, the special effect cell 1 is selected as a jump point, and the special effect cell 1 is determined as a center. In this case, since a special effect cell 5 can be connected to the special effect cell 1 by a ray, and the special effect cell 5 does not overlap the virtual obstacle 1301, the special effect cell 5 is determined as a new starting special effect cell.

According to the method provided in this embodiment of this application, the special effect cells are set in the first range centered around the explosion point of the virtual throwable; the special effect cells in the first range are traversed, and the special effect cell in the first range satisfying the valid diffusion condition is determined as the valid special effect cell; and the virtual fluid substance is diffused based on the valid special effect cell on the surface of the virtual obstacle when the virtual fluid substance encounters the virtual obstacle during the diffusion. In this application, the validity of the special effect cells is traversed through the calculation of the distances between the special effect cells, so as to determine the diffusion direction of the virtual fluid substance, thereby reducing a calculation amount, reducing a requirement on a hardware device, and improving human-computer interaction efficiency.

In a possible implementation, in response to the virtual object entering the diffusion range of the virtual fluid substance, the computer device controls an attribute value of the virtual object.

In some embodiments, the attribute value includes a health point and/or a skill point.

Exemplarily, the computer device reduces the health point and/or the skill point of the virtual object in response to the virtual object entering the diffusion range of the virtual fluid substance.

Exemplarily, the computer device sets the special effect cells in the first range centered around the explosion point of the virtual throwable, the first range being greater than the second range, and the second range indicating the diffusion range of the virtual fluid substance. The computer device reduces the attribute value of the virtual object in response to a distance between a special effect cell at which the virtual object is located and the special effect cell at which the explosion point is located being less than a maximum distance value of the second range.

Exemplarily, the computer device sets the special effect cells in the first range centered around the explosion point of the virtual throwable, the first range being greater than the second range, and the second range indicating the diffusion range of the virtual fluid substance. The computer device reduces the health point and/or the skill point of the virtual object in response to the distance between the special effect cell at which the virtual object is located and the special effect cell at which the explosion point is located being less than the maximum distance value of the second range.

For example, the virtual fluid substance is a virtual stink bomb. After the virtual stink bomb explodes, the virtual stink bomb releases stink. When the virtual object enters a diffusion range of the stink, the health point and the skill point of the virtual object both decrease. When the health point of the virtual object is less than a health threshold, the virtual object enters a non-healthy state. When the skill point of the virtual object is less than a skill threshold, the virtual object is prevented from using a skill.

Exemplarily, the computer device reduces the health point and/or the skill point of the virtual object at a first reduction ratio in response to the virtual object moving acceleratedly in the diffusion range of the virtual fluid substance at a first acceleration.

The first reduction ratio is positively correlated with a speed of the virtual object.

For example, the virtual fluid substance is a virtual stink bomb. After the virtual stink bomb explodes, the virtual stink bomb releases stink. When the virtual object enters a diffusion range of the stink, the health point and the skill point of the virtual object both decrease. A larger movement speed of the virtual object results in faster reduction in the health point and the skill point of the virtual object. When the health point of the virtual object is less than a health threshold, the virtual object enters a non-healthy state. When the skill point of the virtual object is less than a skill threshold, the virtual object is prevented from using a skill.

According to the method provided in this embodiment of this application, the health point and/or the skill point of the virtual object are reduced when the virtual object enters the diffusion range of the virtual fluid substance, and it is determined based on the distance between the special effect cell at which the virtual object is located and the special effect cell at which the explosion point is located whether the virtual object is affected by the virtual fluid substance. When the virtual object is affected by the virtual fluid substance, a change in the movement speed of the virtual object affects the health point and/or the skill point of the virtual object. In this application, the distance between the special effect cell at which the virtual object is located and the special effect cell at which the explosion point is located is calculated to quickly determine whether the virtual object is affected. In this way, a new determination manner is provided, which reduces the calculation amount, reduces the requirement on the hardware device, and improves the human-computer interaction efficiency.

In a possible implementation, the computer device displays the virtual fluid substance varying in gradient at different transparencies in response to the virtual fluid substance being diffused in the second range.

Exemplarily, the computer device sets the special effect cells in the first range centered around the explosion point of the virtual throwable. The computer device determines, based on a distance between a current special effect cell and the special effect cell at which the explosion point is located, a transparency of a virtual fluid substance corresponding to the current special effect cell.

The distance between the current special effect cell and the special effect cell at which the explosion point is located is positively correlated with the transparency of the virtual fluid substance corresponding to the current special effect cell. For example, in the diffusion range of the virtual fluid substance, a farther special effect cell from the explosion point corresponds to a higher transparency of the virtual fluid substance.

According to the method provided in this embodiment of this application, when the virtual fluid substance is diffused in the second range, the virtual fluid substance varying in gradient is displayed at different transparencies. In this application, the distance between the current special effect cell at which the virtual object is located and the special effect cell at which the explosion point is located is calculated, to quickly determine the transparency of the virtual fluid substance corresponding to the current special effect cell. In this way, a new determining manner is provided, which can quickly calculate transparencies corresponding to different positions, thereby reducing the calculation amount, reducing the requirement on the hardware device, and improving the human-computer interaction efficiency.

In a possible implementation, in response to the virtual fluid substance encountering a dynamic virtual obstacle during the diffusion, the computer device changes the diffusion direction of the virtual fluid substance based on the dynamic virtual obstacle.

Exemplarily, the computer device sets the special effect cells in the first range centered around the explosion point of the virtual throwable. The computer device traverses the special effect cells in the first range, and determines the special effect cell in the first range satisfying the valid diffusion condition as a valid special effect cell. The computer device determines, based on a diffusion range of the virtual fluid substance at an $i^{th}$ moment, a quantity of valid special effect cells corresponding to the diffusion range at the $i^{th}$ moment and a first position occupied by the dynamic virtual obstacle. The computer device determines a quantity of valid special effect cells occupied by the dynamic virtual obstacle in response to the dynamic virtual obstacle moving to a second position at an $(i+1)^{th}$ moment. The computer device equi-proportionally adds valid special effect cells to the first position based on the quantity of valid special effect cells corresponding to the diffusion range of the virtual fluid substance at the $i^{th}$ moment and the quantity of valid special effect cells occupied by the dynamic virtual obstacle at the second position, and diffuses the virtual fluid substance based on the added valid special effect cells.

A quantity of valid special effect cells corresponding to the diffusion range of the virtual fluid substance varies in a normal distribution over time.

For example, at a first moment, the computer device determines that the quantity of valid special effect cells corresponding to the diffusion range of the virtual fluid substance is 100 and the first position occupied by a virtual vehicle. At the first moment, the quantity of valid special effect cells corresponding to the diffusion range of the virtual fluid substance is 80. In response to the virtual vehicle moving to the second position at a second moment and the virtual vehicle occupying 20 valid special effect cells at the second position, 16 valid special effect cells are added to the first position, and the virtual fluid substance is diffused based on the added valid special effect cells, thereby obtaining a more realistic diffusion effect of the virtual fluid substance. In this way, user experience is improved.

In a possible implementation, the computer device sets the special effect cells in the first range centered around the explosion point of the virtual throwable. The computer device traverses the special effect cells in the first range based on a preset frequency, and refreshes the valid special effect cell in the first range satisfying the valid diffusion condition; and determines the diffusion direction of the virtual fluid substance based on the refreshed valid special effect cell when the virtual fluid substance encounters a dynamic virtual obstacle during the diffusion.

According to the method provided in this embodiment of this application, in response to the virtual fluid substance encountering the dynamic virtual obstacle during the diffusion, the computer device changes the diffusion direction of the virtual fluid substance based on the dynamic virtual obstacle. In this application, the quantity of valid special effect cells corresponding to the diffusion range at the $i^{th}$ moment, the first position occupied by the dynamic virtual obstacle, the quantity of valid special effect cells corresponding to the diffusion range at the $i^{th}$ moment, and the quantity of valid special effect cells occupied by the dynamic virtual obstacle at the second position are calculated, and the valid special effect cells are equi-proportionally added behind the dynamic virtual obstacle during the movement of the dynamic virtual obstacle, thereby simulating a more realistic diffusion effect of the virtual fluid substance. In this way, the user experience is improved.

In summary, according to method provided in this embodiment of this application, the computer device displays the virtual environment picture; displays the diffusive virtual fluid substance released by the virtual throwable in response to the thrown virtual throwable exploding in the virtual environment picture; and changes the diffusion direction of the virtual fluid substance based on the virtual obstacle in response to the virtual fluid substance encountering the virtual obstacle during the diffusion. According to this application, through the changing of the diffusion direction of the virtual fluid substance based on the virtual obstacle, a realistic scenario of changing the direction of the virtual fluid substance when the virtual fluid substance encounters the obstacle is simulated, thereby simulating a more realistic diffusion effect of the virtual fluid substance. In this way, user experience is improved.

Figure 14:
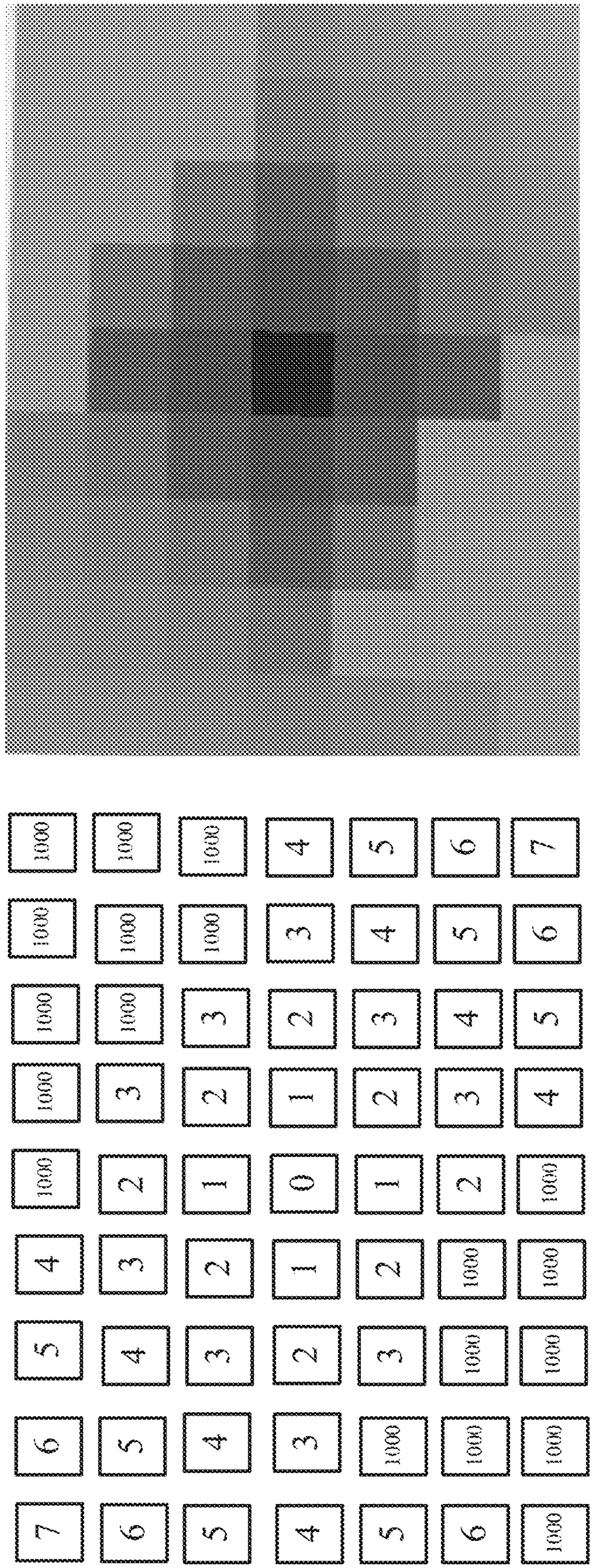
FIG. 14 is a schematic diagram of rendering a virtual fluid substance according to an exemplary embodiment of this application.

Exemplarily, in addition to determining the diffusion direction of the virtual fluid substance, the obtained valid special effect cells may be further configured for rendering the virtual fluid substance. FIG. 14 is a schematic diagram of rendering a virtual fluid substance. As shown in (a) in FIG. 14, special effect cells are set in a first range centered around an explosion point of a virtual throwable; a special effect cell at which the explosion point is located is used as a starting special effect cell; special effect cells adjacent to the starting special effect cell are traversed, a special effect cell that is adjacent to the starting special effect cell and satisfies a valid diffusion condition is determined as a valid special effect cell, and the special effect cell is determined as a next starting special effect cell; the above operation is repeated until all of the special effect cells in the first range are traversed; and the virtual fluid substance is diffused based on the valid special effect cell.

The computer device generates a mask image based on the valid special effect cell, and then applies the mask image as a transparency to a final transparency of the virtual fluid substance. The computer device determines, based on Manhattan distance information of each valid special effect cell relative to the special effect cell at the position at which the explosion point is located, a color value corresponding to the valid special effect cell. For example, the color value of each valid special effect cell is set to linear color information. In other words, if a color value corresponding to a valid special effect cell is in a range of 0 to 1, the color value of each valid special effect cell may be calculated through a distance value of the valid special effect cell and a maximum diffusion distance of the virtual fluid substance. For example, if a distance of a current valid special effect cell is 4 and the maximum diffusion distance of the virtual fluid substance is 10, a color value corresponding to the special effect cell is 0.4. A rendered image obtained through rendering of the valid special effect cell in (a) in FIG. 14 is shown in (b) in FIG. 14.

Figure 15:
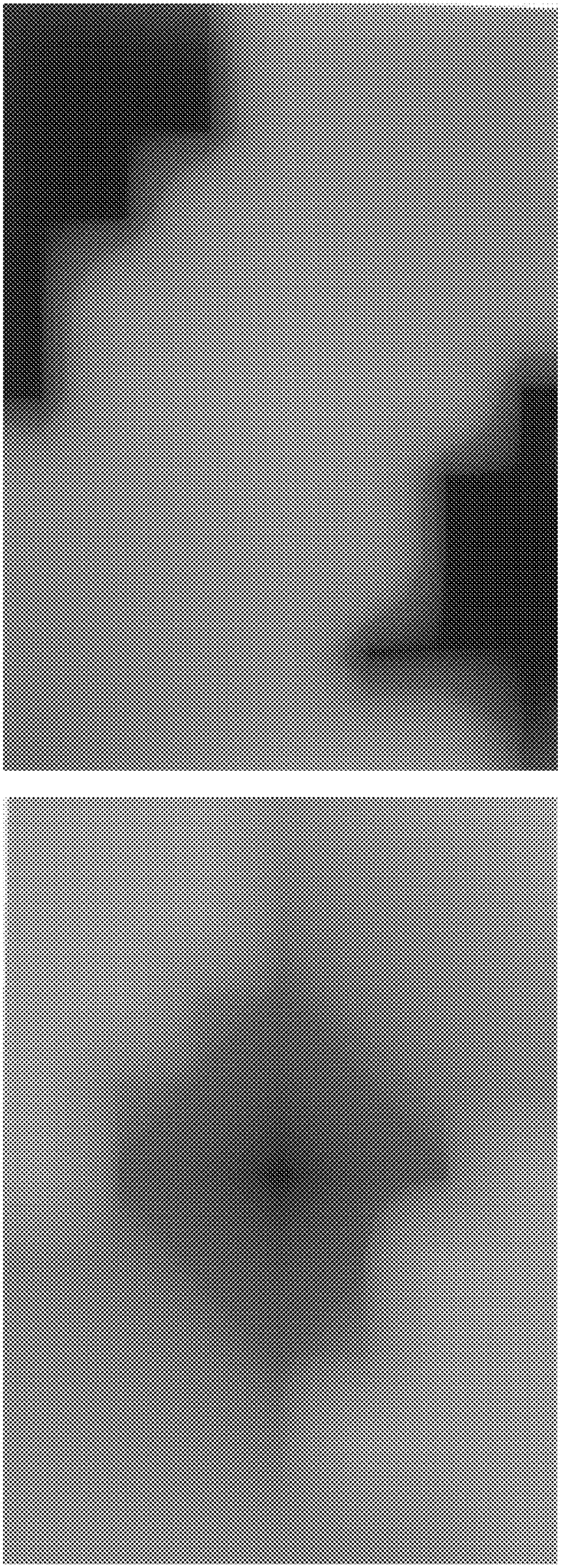
FIG. 15 is a schematic diagram of rendering a virtual fluid substance according to an exemplary embodiment of this application.

As shown in (a) in FIG. 15, after the rendered image is obtained through the rendering of the valid special effect cell, a texture format in the rendered image is set by using a linear interpolation sampling method, to obtain softer edges. Since a larger distance results in a larger transparency, after the color value is calculated, the original color value is subtracted from 1 to obtain an opposite color, i.e., a transparency, as shown in (b) in FIG. 15.

Figure 16:
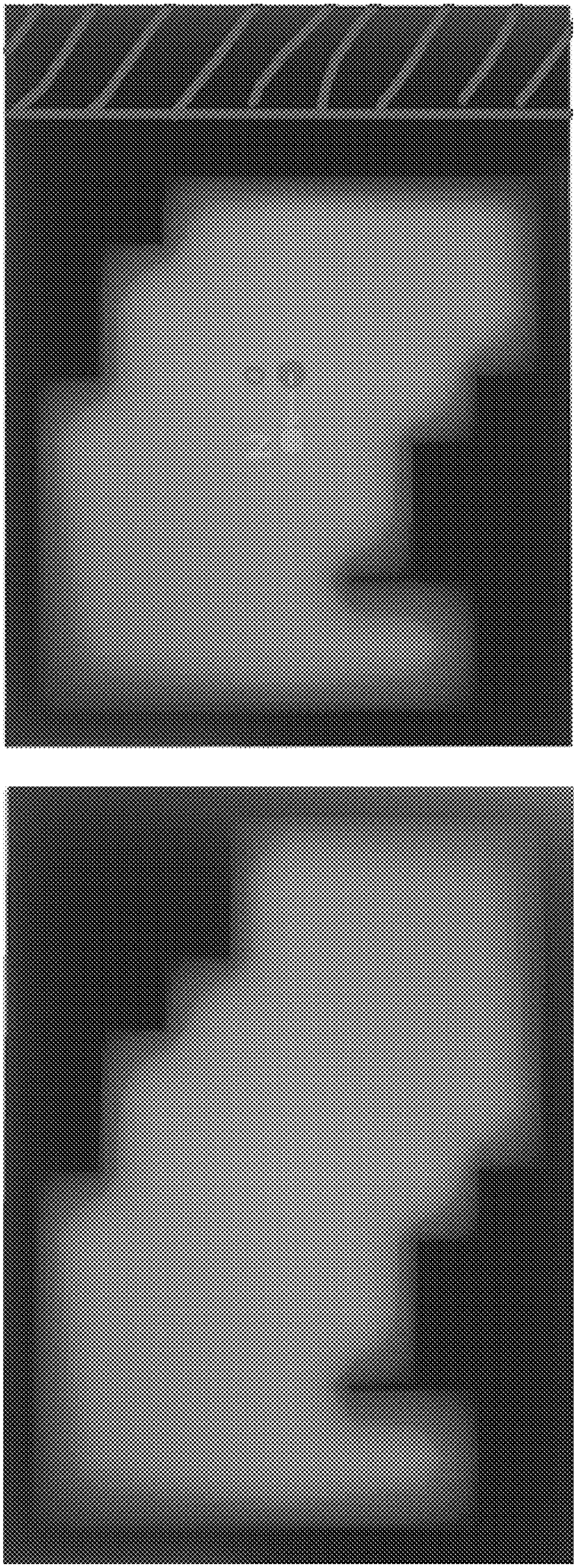
FIG. 16 is a schematic diagram of rendering a virtual fluid substance according to an exemplary embodiment of this application.

Exemplarily, the computer device generates a sampling UV coordinate by using a world coordinate center position and a length and a width of the virtual fluid substance, and performs texture sampling by using the UV coordinate to obtain a transparency, and may obtain a final rendering effect by multiplying the transparency by the transparency corresponding to valid special effect cell. However, since a rendering range of the virtual fluid substance is greater than the second range, an incorrect result is easily caused by overflow at the edges of the virtual fluid substance. Therefore, a circle of black edge is added to the original mask image (i.e., to the valid special effect cell), to obtain a better softening effect, as shown in (a) in FIG. 16. When the virtual fluid substance encounters a virtual obstacle, as shown in a right region in (b) in FIG. 16, a useless black region emerges in the right region. To save an internal memory, a minimum value and a maximum value of a coordinate of the region are additionally recorded during generation of the special effect cell, an average value of the minimum value and the maximum value is used as a new center cell, and a difference thereof is used as a region size of a new virtual fluid substance. Finally, the right region is cut off based on the new center cell and the region size of the new virtual fluid substance, to obtain a new rendered image.

Figure 17:
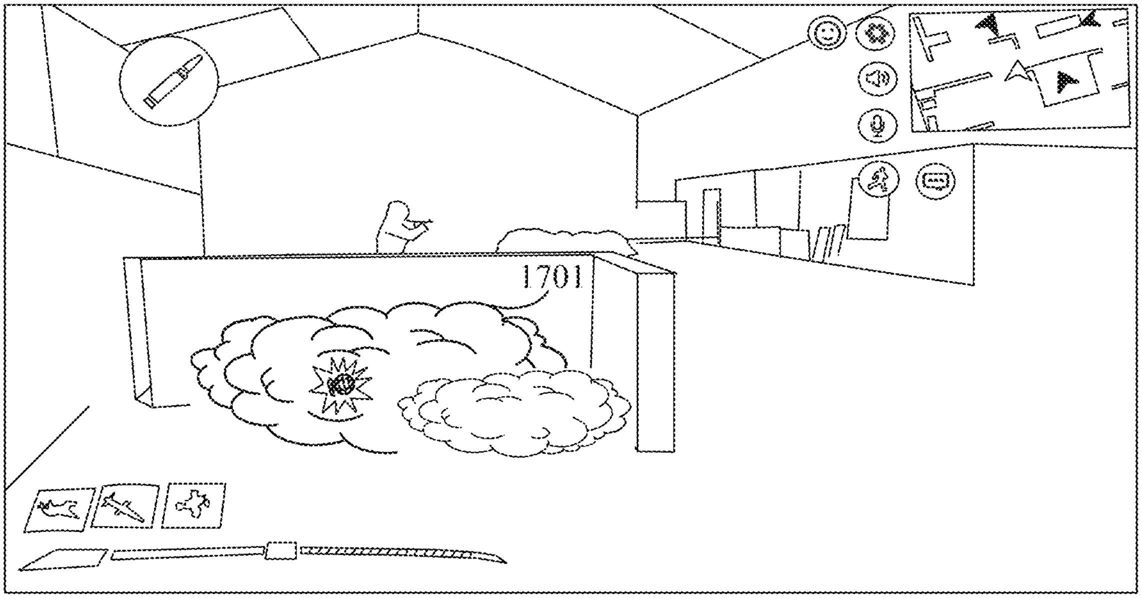
FIG. 17 is a schematic structural diagram of a rendering result of a three-dimensional (3D) valid special effect cell according to an exemplary embodiment of this application.
Figure 17:
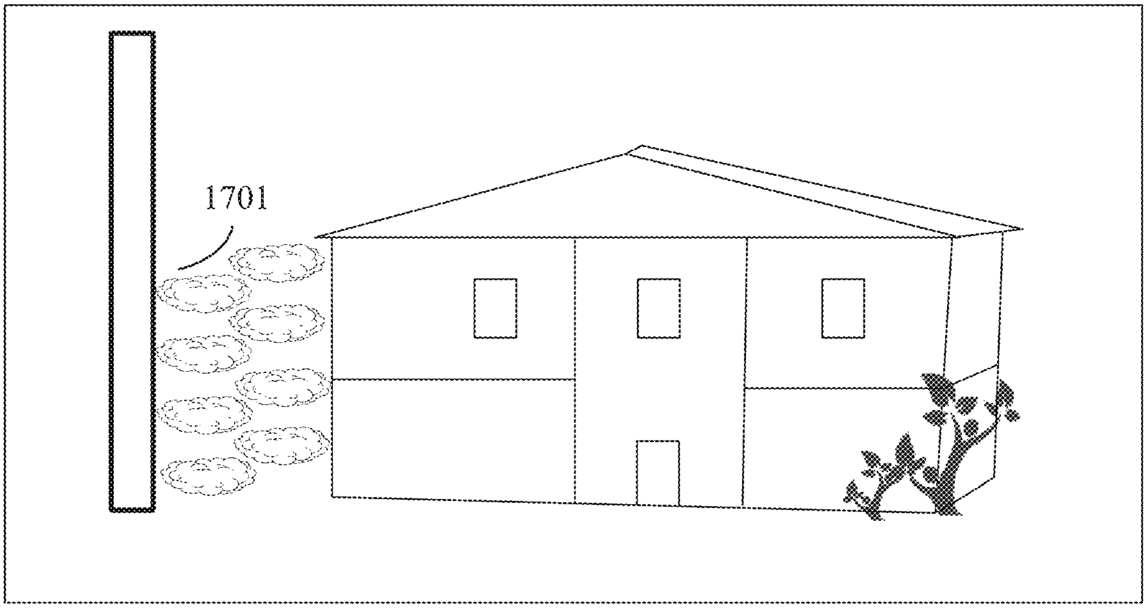

Exemplarily, in the above embodiment, the virtual fluid substance is rendered based on a two dimension. The method is further applicable to rendering of a valid special effect cell based on a three dimension. A rendering result of the valid special effect cell based on the three dimension is shown in FIG. 17. As shown in (a) in FIG. 17, a virtual fluid substance 1701 is obstructed by a corner formed by a virtual obstacle during diffusion. As shown in (b) in FIG. 17, the virtual fluid substance 1701 is obstructed by a left wall during the diffusion.

Figure 18:
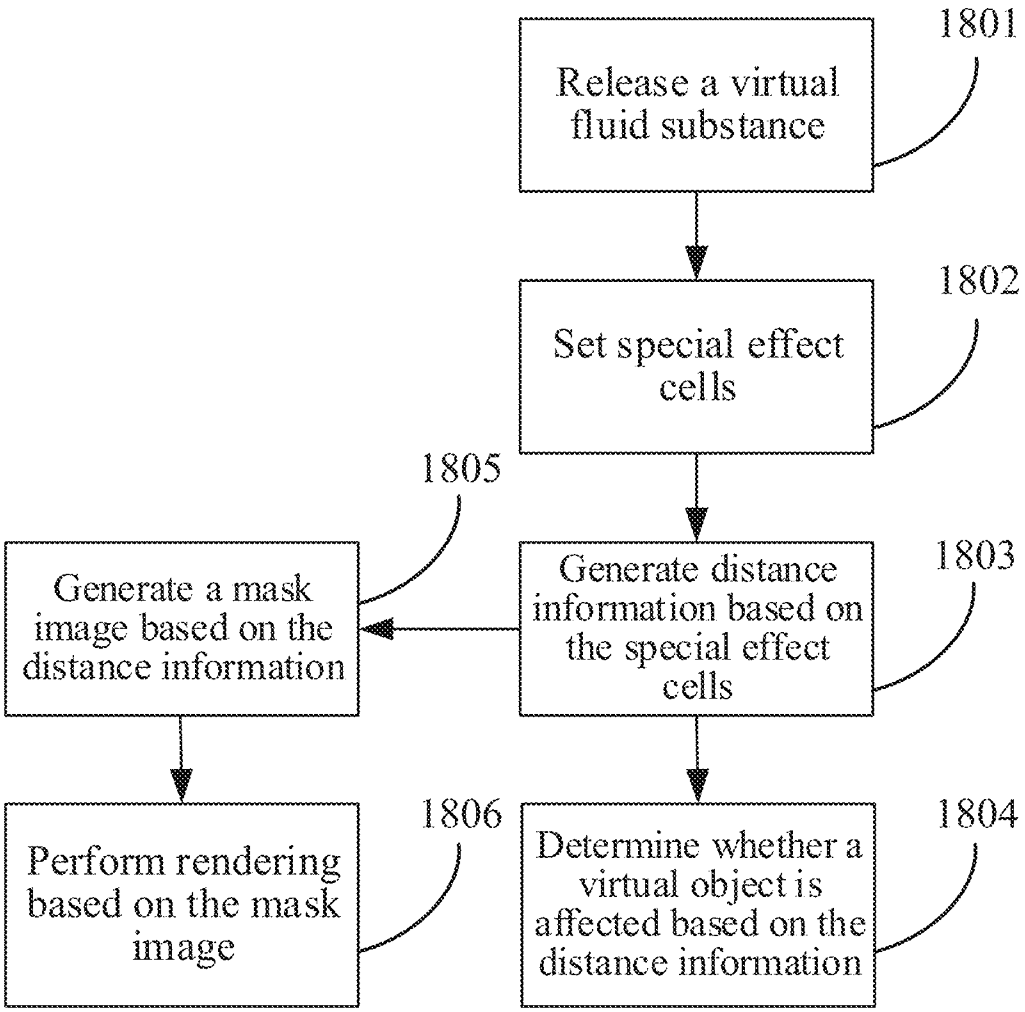
FIG. 18 is a flowchart of a method for controlling a virtual throwable according to an exemplary embodiment of this application.

FIG. 18 is a flowchart of a method for controlling a virtual throwable according to an exemplary embodiment of this application. The method may be performed by a computer device. The computer device may be the terminal or the server shown in FIG. 4. The method includes the following operations:

Operation 1801: Release a virtual fluid substance.

Exemplarily, in response to a thrown virtual throwable exploding in a virtual environment picture, the computer device displays a virtual fluid substance released by the virtual throwable.

In some embodiments, the virtual throwable includes at least one of a virtual smoke bomb, a virtual frangible grenade, a virtual gas bottle, and the like, which is not limited in this embodiment of this application.

The virtual fluid substance refers to a virtual fluid substance with a fluid property released by the virtual throwable. The virtual fluid substance has diffusivity. If a virtual smoke bomb is used as an example, the virtual fluid substance refers to smoke released by the virtual smoke bomb.

Operation 1802: Set special effect cells.

Exemplarily, the computer device sets special effect cells in a first range centered around an explosion point of the virtual throwable, the special effect cells being configured for determining a diffusion direction of the virtual fluid substance, and the first range being greater than a second range, the second range indicating a diffusion range of the virtual fluid substance. The computer device traverses the special effect cells in the first range, and determines a special effect cell in the first range satisfying a valid diffusion condition as a valid special effect cell.

Operation 1803: Generate distance information based on the special effect cells.

Exemplarily, the computer device generates distance information corresponding to a special effect cell at which a virtual object is currently located based on a special effect cell at the current position at which the virtual object is currently located and a special effect cell at which the explosion point is located.

Operation 1804: Determine whether a virtual object is affected based on the distance information.

Exemplarily, the computer device determines whether the virtual object is affected based on a distance value between the special effect cell at which the virtual object is located and the special effect cell at which the explosion point is located.

Operation 1805: Generate a mask image based on the distance information.

Exemplarily, the computer device determines the valid special effect cell based on the distance information between the special effect cell at which the virtual object is located and the special effect cell at which the explosion point is located, and generates the mask image based on the valid special effect cell.

Operation 1806: Perform rendering based on the mask image.

Exemplarily, the computer device performs rendering based on the mask image, to obtain a diffusion effect image of the virtual fluid substance.

Figure 19:
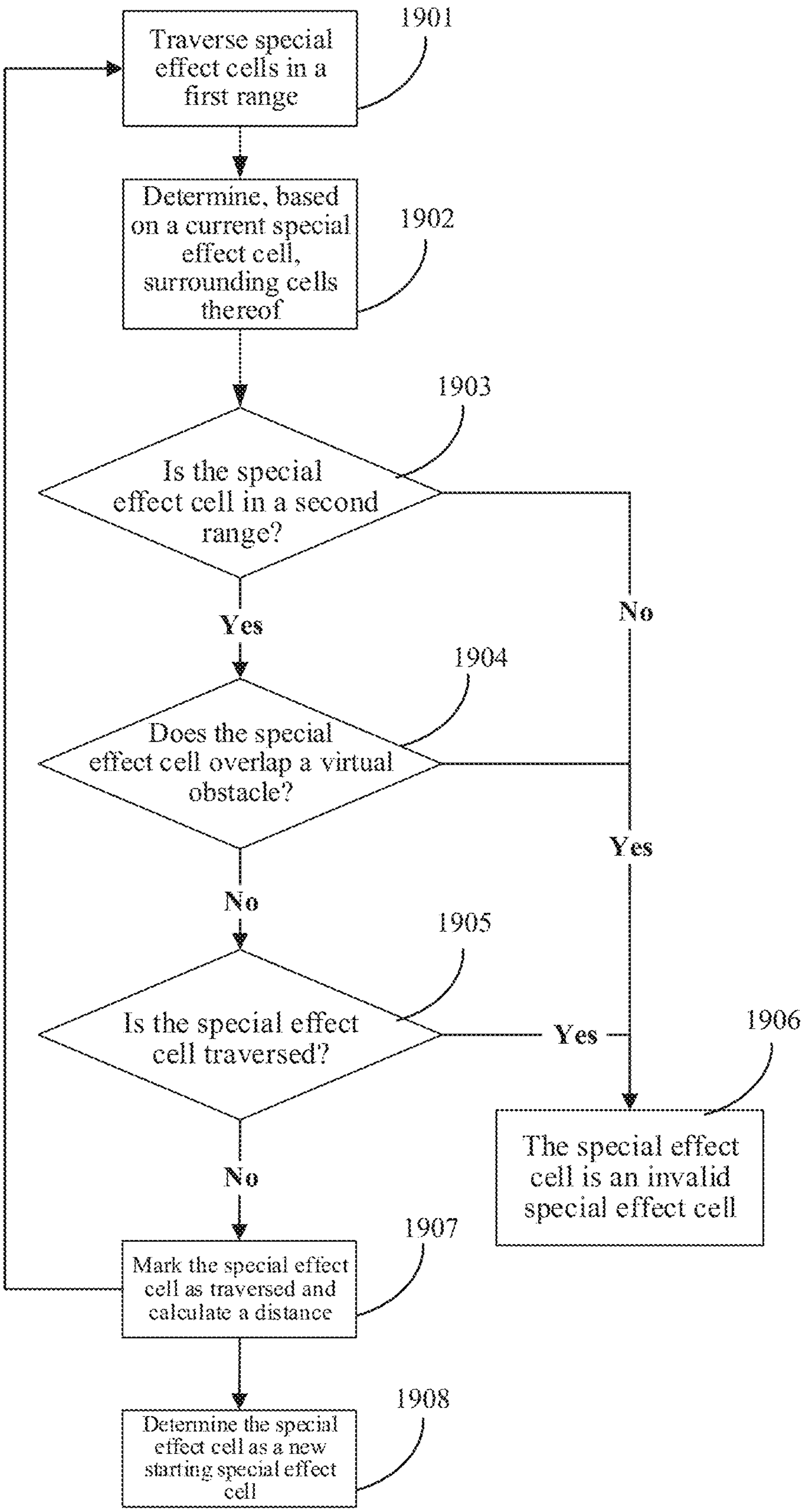
FIG. 19 is a flowchart of a method for controlling a virtual throwable according to an exemplary embodiment of this application.

FIG. 19 is a flowchart of a method for controlling a virtual throwable according to an exemplary embodiment of this application. The method may be performed by a computer device. The computer device may be the terminal or the server shown in FIG. 4. The method includes the following operations:

Operation 1901: Traverse special effect cells in a first range.

Exemplarily, in response to a thrown virtual throwable exploding in a virtual environment picture, the computer device displays a virtual fluid substance released by the virtual throwable.

In some embodiments, the virtual fluid substance is at least one of a gas, a liquid, a non-Newtonian fluid, and the like, which is not specifically limited in this embodiment of this application.

Exemplarily, the computer device sets the special effect cells in the first range centered around an explosion point of the virtual throwable, the special effect cells being configured for determining a diffusion direction of the virtual fluid substance, and the first range being greater than a second range, the second range indicating a diffusion range of the virtual fluid substance. The computer device traverses the special effect cells in the first range, and determines a special effect cell in the first range satisfying a valid diffusion condition as a valid special effect cell.

Operation 1902: Determine, based on a current special effect cell, surrounding cells thereof.

Exemplarily, the computer device uses a special effect cell at which the explosion point is located as a starting special effect cell, and traverses special effect cells adjacent to the starting special effect cell.

Operation 1903: Determine whether the special effect cell is in a second range.

Exemplarily, the computer device determines whether the special effect cell is in the second range of the virtual throwable. When the special effect cell is in the second range of the virtual throwable, operation 1904 is performed. When the special effect cell is not in the second range of the virtual throwable, operation 1906 is performed.

Operation 1904: Determine whether the special effect cell overlaps a virtual obstacle.

Exemplarily, when the special effect cell is in the second range of the virtual throwable, it is determined whether the special effect cell overlaps the virtual obstacle. When the special effect cell overlaps the virtual throwable, operation 1906 is performed. When the special effect cell does not overlap the virtual obstacle, operation 1905 is performed.

Operation 1905: Determine whether the special effect cell is traversed.

Exemplarily, when the special effect cell is in the second range of the virtual throwable and the special effect cell does not overlap the virtual obstacle, it is determined whether the special effect cell is traversed. When the special effect cell is traversed, operation 1906 is performed. When the special effect cell is not traversed, operation 1907 is performed.

Operation 1906: Determine that the special effect cell is an invalid special effect cell.

Operation 1907: Mark the special effect cell as traversed and calculate a distance.

Exemplarily, when the special effect cell is in the second range of the virtual throwable, the special effect cell does not overlap virtual obstacle, and the special effect cell is not traversed, the special effect cell is marked as traversed, and a distance between the special effect cell and a center cell is calculated.

Operation 1908: Determine the special effect cell as a new starting special effect cell.

Exemparily, the special effect cell is determined as the valid special effect cell based on the distance between the special effect cell and the center cell, and is determined as the new starting special effect cell. The above operation is repeated until no new valid special effect cell exists in the first range or until all of the special effect cells in the first range are traversed.

An apparatus for controlling a virtual throwable provided in the embodiments of this application is described below.

Figure 20:
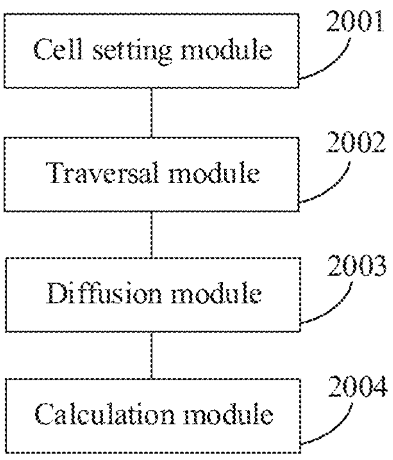
FIG. 20 is a schematic structural diagram of an apparatus for controlling a virtual throwable according to an exemplary embodiment of this application.

FIG. 20 is a schematic structural diagram of an apparatus for controlling a virtual throwable according to an exemplary embodiment of this application. The apparatus may be implemented as all or a part of a computer device through software, hardware, or a combination thereof. The apparatus includes a cell setting module 2001, a traversal module 2002, a diffusion module 2003, and a calculation module 2004.

The cell setting module 2001 is configured to set, in response to a thrown virtual throwable exploding and releasing a virtual fluid substance in a virtual environment picture, special effect cells in a first range centered around an explosion point of the virtual throwable, the special effect cells being configured for determining a diffusion direction of the virtual fluid substance, and the first range being greater than a second range, the second range indicating a diffusion range of the virtual fluid substance.

The traversal module 2002 is configured to traverse the special effect cells in the first range, and determine a special effect cell in the first range satisfying a valid diffusion condition as a valid special effect cell.

The diffusion module 2003 is configured to diffuse, when the virtual fluid substance encounters a virtual obstacle during diffusion, the virtual fluid substance based on a valid special effect cell on a surface of the virtual obstacle.

The valid diffusion condition includes at least one of the special effect cell being in the second range, the special effect cell not overlapping the virtual obstacle, and the special effect cell being not traversed.

In a possible implementation, the traversal module 2002 is configured to: use a special effect cell at which the explosion point is located as a starting special effect cell, the starting special effect cell being used as a starting point for traversing other special effect cells; traverse special effect cells adjacent to the starting special effect cell, determine a special effect cell that is adjacent to the starting special effect cell and satisfies the valid diffusion condition as a valid special effect cell, and determine the special effect cell as a next starting special effect cell; and repeat the above operation until all of the special effect cells in the first range are traversed.

In a possible implementation, the traversal module 2002 is configured to use the special effect cell at which the explosion point is located as a starting special effect cell when the special effect cell at which the explosion point is located is a valid special effect cell.

In a possible implementation, the traversal module 2002 is configured to use a special effect cell in the first range satisfying a ray detection condition as the starting special effect cell when the special effect cell at which the explosion point is located is not a valid special effect cell.

The ray detection condition includes a to-be-detected special effect cell being connected to the special effect cell at which the explosion point is located by a ray and the to-be-detected special effect cell not overlapping the virtual obstacle.

In a possible implementation, the cell setting module 2001 is configured to set the special effect cells in the first range centered around the explosion point of the virtual throwable, the first range being greater than the second range, and the second range indicating the diffusion range of the virtual fluid substance.

The calculation module 2004 is configured to reduce an attribute value of the virtual object in response to a distance between a special effect cell at which the virtual object is located and the special effect cell at which the explosion point is located being less than a maximum distance value of the second range.

In a possible implementation, the attribute value includes a health point and/or a skill point. The calculation module 2004 is configured to reduce the health point and/or the skill point of the virtual object in response to the distance between the special effect cell at which the virtual object is located and the special effect cell at which the explosion point is located being less than the maximum distance value of the second range.

In a possible implementation, the cell setting module 2001 is configured to set the special effect cells in the first range centered around the explosion point of the virtual throwable.

In a possible implementation, the calculation module 2004 is configured to determine, based on a distance between a current special effect cell and the special effect cell at which the explosion point is located, a transparency of a virtual fluid substance corresponding to the current special effect cell.

The distance between the current special effect cell and the special effect cell at which the explosion point is located is positively correlated with the transparency of the virtual fluid substance corresponding to the current special effect cell.

In a possible implementation, the cell setting module 2001 is configured to set the special effect cells in the first range centered around the explosion point of the virtual throwable.

In a possible implementation, the traversal module 2002 is configured to traverse the special effect cells in the first range, and determine the special effect cell in the first range satisfying the valid diffusion condition as a valid special effect cell; and determine, based on a diffusion range of the virtual fluid substance at an $i^{th}$ moment, a quantity of valid special effect cells corresponding to the diffusion range at the $i^{th}$ moment and a first position occupied by a dynamic virtual obstacle; and determine a quantity of valid special effect cells occupied by the dynamic virtual obstacle in response to the dynamic virtual obstacle moving to a second position at an $(i+1)^{th}$ moment.

In a possible implementation, the calculation module 2004 is configured to equi-proportionally add valid special effect cells to the first position based on the quantity of valid special effect cells corresponding to the diffusion range of the virtual fluid substance at the $i^{th}$ moment and the quantity of valid special effect cells occupied by the dynamic virtual obstacle at the second position, and diffuse the virtual fluid substance based on the added valid special effect cells.

A quantity of valid special effect cells corresponding to the diffusion range of the virtual fluid substance varies in a normal distribution over time, and i is a positive integer.

Figure 21:
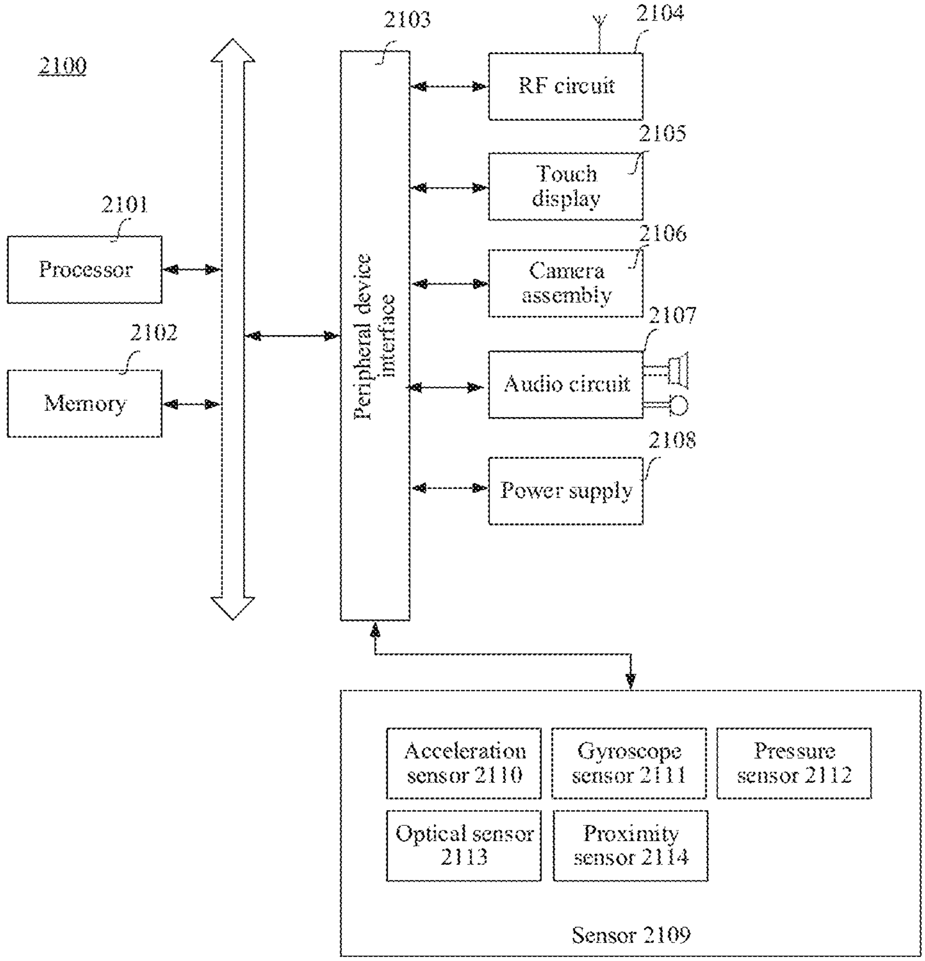
FIG. 21 is a structural block diagram of a computer device according to an exemplary embodiment of this application.

FIG. 21 is a structural block diagram of a computer device 2100 according to an exemplary embodiment of this application. The computer device 2100 may be a portable mobile terminal, for example, a smartphone, a tablet computer, an MP3 player, or an MP4 player. The computer device 2100 may alternatively be referred to as another name such as a user equipment or a portable terminal.

Generally, the computer device 2100 includes a processor 2101 and a memory 2102.

The processor 2101 may include one or more processing cores, for example, a 4-core processor or an 8-core processor. The processor 2101 may be implemented in at least one hardware form of a digital signal processor (DSP), a field programmable gate array (FPGA), and a programmable logic array (PLA). The processor 2101 may alternatively include a main processor and a coprocessor. The main processor is a processor configured to process data in a wake-up state, which is also referred to as a CPU. The coprocessor is a low-power processor configured to process data in a standby state. In some embodiments, the processor 2101 may have a GPU integrated therein. The GPU is configured to render and draw content that needs to be displayed on a display. In some embodiments, the processor 2101 may further include an AI processor. The AI processor is configured to process computing operations related to machine learning.

The memory 2102 may include one or more computer-readable storage media. The computer-readable storage media may be tangible and non-transient. The memory 2102 may further include a high-speed random access memory and a non-volatile memory, for example, one or more disk storage devices or flash storage devices. In some embodiments, the non-transient computer-readable storage medium in the memory 2102 is configured to store at least one instruction. The at least one instruction is configured to be executed by the processor 2101 to implement the method for controlling a virtual throwable provided in the embodiments of this application.

In some embodiments, the computer device 2100 may include a peripheral device interface 2103 and at least one peripheral device. Specifically, the peripheral device includes at least one of a radio frequency (RF) circuit 2104, a touch display 2105, a camera assembly 2106, an audio circuit 2107, and a power supply 2108.

The peripheral device interface 2103 may be configured to connect the at least one peripheral device related to input/output (I/O) to the processor 2101 and the memory 2102. In some embodiments, the processor 2101, the memory 2102, and the peripheral device interface 2103 are integrated on the same chip or circuit board. In some other embodiments, any one or both of the processor 2101, the memory 2102, and the peripheral device interface 2103 may be implemented on an independent chip or circuit board, which is not limited in this embodiment.

The RF circuit 2104 is configured to receive and transmit an RF signal, which is also referred to as an electromagnetic signal. The RF circuit 2104 communicates with a communication network and another communication device through the electromagnetic signal. The RF circuit 2104 converts an electric signal into an electromagnetic signal for transmission, or converts a received electromagnetic signal into an electric signal. In some embodiments, the RF circuit 2104 includes an antenna system, an RF transceiver, one or more amplifiers, a tuner, an oscillator, a DSP, a codec chipset, a user identity module card, and the like. The RF circuit 2104 may communicate with another terminal through at least one wireless communication protocol. The wireless communication protocol includes but is not limited to the World Wide Web, a metropolitan area network, the Intranet, various generations of mobile communication networks (2G, 3G, 4G, and 5G), a wireless local area network, and/or a wireless fidelity (Wi-Fi) network. In some embodiments, the RF circuit 2104 may further include a near field communication (NFC)-related circuit, which is not limited in this application.

The touch display 2105 is configured to display a UI. The UI may include graphics, texts, icons, videos, and any combination thereof. The touch display 2105 further has a capability of collecting a touch signal on or above a surface of the touch display 2105. The touch signal may be inputted into the processor 2101 as a control signal for processing. The touch display 2105 is configured to provide a virtual button and/or a virtual keyboard, which is also referred to as a soft button and/or a soft keyboard. In some embodiments, one touch display 2105 may be arranged on a front panel of the computer device 2100. In some other embodiments, at least two touch displays 2105 may be respectively arranged on different surfaces of the computer device 2100 or may be folded. In some other embodiments, the touch display 2105 may be a flexible display arranged on a bendable surface or a foldable surface of the computer device 2100. The touch display 2105 may alternatively be arranged as a non-rectangular irregular pattern, i.e., a special-shaped screen. The touch display 2105 may be manufactured by using a material such as a liquid crystal display (LCD) or an organic light-emitting diode (OLED).

The camera assembly 2106 is configured to capture an image or a video. In some embodiments, the camera assembly 2106 includes a front camera and a rear camera. Generally, the front camera is configured to achieve a video call or a selfie, and the rear camera is configured to take a photograph or record a video. In some embodiments, at least two rear cameras are arranged, which are respectively any one of a main camera, a depth-of-field camera, and a wide-angle camera, so as to achieve a background blurring function through fusion of the main camera and the depth-of-field camera, achieve a panoramic photographing function through fusion of the main camera and the wide-angle camera, and achieve a VR photographing function. In some embodiments, the camera assembly 2106 may further include a flashlight. The flashlight may be a single-color-temperature flashlight or a dual-color-temperature flashlight. The dual-color-temperature flashlight is a combination of a warm flashlight and a cold flashlight, and may be configured for light compensation at different color temperatures.

The audio circuit 2107 is configured to provide an audio interface between a user and the computer device 2100. The audio circuit 2107 may include a microphone and a speaker. The microphone is configured to collect a sound wave of a user and an environment, and convert the sound wave into an electrical signal and input the electrical signal to the processor 2101 for processing, or input the electrical signal to the RF circuit 2104 to achieve voice communication. For stereo collection or noise reduction, a plurality of microphones may be respectively arranged at different parts of the computer device 2100. The microphone may alternatively be an array microphone or an omnidirectional collection microphone. The speaker is configured to convert an electrical signal from the processor 2101 or the RF circuit 2104 into a sound wave. The speaker may be a conventional film speaker, or may be a piezoelectric ceramic speaker. When the speaker is the piezoelectric ceramic speaker, the speaker can not only convert an electric signal into a sound wave audible to human beings, but also convert the electric signal into a sound wave inaudible to human beings for ranging and the like. In some embodiments, the audio circuit 2107 may further include a headphone jack.

The power supply 2108 is configured to supply power to components in the computer device 2100. The power supply 2108 may be an alternating current power supply, a direct current power supply, a disposable battery, or a rechargeable battery. When the power supply 2108 includes a rechargeable battery, the rechargeable battery may be a wired rechargeable battery or a wireless rechargeable battery. The wired rechargeable battery is a battery charged through a wired line, and the wireless rechargeable battery is a battery charged through a wireless coil. The rechargeable battery may be further configured to support a fast charging technology.

In some embodiments, the computer device 2100 further includes one or more sensors 2109. The one or more sensors 2109 include but are not limited to an acceleration sensor 2110, a gyroscope sensor 2111, a pressure sensor 2112, an optical sensor 2113, and a proximity sensor 2114.

A person skilled in the art may understand that the structure shown in FIG. 21 does not constitute a limitation on the computer device 2100, and the computer device may include more or fewer components than those shown in the figure, or some merged components, or different component arrangements.

An embodiment of this application further provides a computer device. The computer device includes a processor and a memory, the memory having at least one computer program stored therein, the at least one computer program being loaded and executed by the processor, to implement the method for controlling a virtual throwable provided in the above method embodiments.

An embodiment of this application further provides a non-transitory computer-readable storage medium, having at least one computer program stored therein, the at least one computer program being loaded and executed by a processor, to implement the method for controlling a virtual throwable provided in the above method embodiments.

An embodiment of this application further provides a computer program product, including a computer program, the computer program being stored in a computer-readable storage medium. A processor of a computer device reads the computer program from the computer-readable storage medium and executes the computer program, to cause the computer device to implement the method for controlling a virtual throwable provided in the above method embodiments.

"A plurality of" mentioned herein means two or more. "And/or" describes an association relationship between associated objects, and indicates that three relationships may exist. For example, A and/or B may represent the following three cases: only A exists, both A and B exist, and only B exists. The character "/" generally indicates an "or" relationship between the associated objects.

A person of ordinary skill in the art may understand that all or some of the operations implementing the above embodiments may be implemented by hardware, or may be implemented by instructing relevant hardware through a program. The program may be stored in a computer-readable storage medium. The storage medium may be a read-only memory, a disk, an optical disc, or the like.

The above descriptions are merely embodiments of this application, and are not intended to limit this application. Any modification, equivalent replacement, or improvement made within the spirit and principle of this application falls within the protection scope of this application.

What is claimed is:

1. A method for controlling a virtual throwable performed by a computer device, the method comprising:

in response to a thrown virtual throwable exploding and releasing a virtual fluid substance in a virtual environment picture, defining special effect cells in a first range centered around an explosion point of the virtual throwable;

traversing the special effect cells in the first range, and identifying, among the special effect cells, one or more valid special effect cells in the first range satisfying a valid diffusion condition; and when the virtual fluid substance encounters a virtual obstacle during diffusion, diffusing the virtual fluid substance based on one of the one or more valid special effect cells on a surface of the virtual obstacle, the valid diffusion condition comprising at least one of the one or more valid special effect cells not overlapping the virtual obstacle.

2. The method according to claim 1, wherein the traversing the special effect cells in the first range, and identifying, among the special effect cells, one or more valid special effect cells in the first range satisfying a valid diffusion condition comprises:

selecting a special effect cell at which the explosion point is located as a starting point for traversing other special effect cells;

traversing special effect cells adjacent to the starting special effect cell, determining, among the special effect cells adjacent to the starting special effect cell, a special effect cell that satisfies the valid diffusion condition as a valid special effect cell, and determining the special effect cell as a next starting special effect cell; and repeating the above operation until all of the special effect cells in the first range are traversed.

3. The method according to claim 2, wherein the selecting a special effect cell at which the explosion point is located as a starting point for traversing other special effect cells comprises:

using a special effect cell in the first range satisfying a ray detection condition as the starting special effect cell when the special effect cell at which the explosion point is located is not a valid special effect cell, the ray detection condition comprising a to-be-detected special effect cell being connected to the special effect cell at which the explosion point is located by a ray and the to-be-detected special effect cell not overlapping the virtual obstacle.

4. The method according to claim 1, wherein the virtual environment picture comprises a virtual object; and the method further comprises:

selecting the special effect cells centered around the explosion point of the virtual throwable in the first range and outside a second range, the second range indicating the diffusion range of the virtual fluid substance; and reducing an attribute value of the virtual object in response to a distance between a special effect cell at which the virtual object is located and the special effect cell at which the explosion point is located being less than a maximum distance value of the second range.

5. The method according to claim 4, wherein the attribute value comprises a health point and/or a skill point; and the reducing an attribute value of the virtual object in response to a distance between a special effect cell at which the virtual object is located and the special effect cell at which the explosion point is located being less than a maximum distance value of the second range comprises:

reducing the health point and/or the skill point of the virtual object in response to the distance between the special effect cell at which the virtual object is located and the special effect cell at which the explosion point is located being less than the maximum distance value of the second range.

6. The method according to claim 1, further comprising:

selecting the special effect cells in the first range centered around the explosion point of the virtual throwable; and determining, based on a distance between a current special effect cell and the special effect cell at which the explosion point is located, a transparency of a virtual fluid substance corresponding to the current special effect cell, the distance between the current special effect cell and the special effect cell at which the explosion point is located being positively correlated with the transparency of the virtual fluid substance corresponding to the current special effect cell.

7. The method according to claim 1, further comprising:

selecting the special effect cells in the first range centered around the explosion point of the virtual throwable;

traversing the special effect cells in the first range, and identifying, among the special effect cells in the first range, the special effect cell in the first range satisfying the valid diffusion condition as a valid special effect cell;

determining, based on a diffusion range of the virtual fluid substance at an $i^{th}$ moment, a quantity of valid special effect cells corresponding to the diffusion range at the $i^{th}$ moment and a first position occupied by a dynamic virtual obstacle;

determining a quantity of valid special effect cells occupied by the dynamic virtual obstacle in response to the dynamic virtual obstacle moving to a second position at an $(i+1)^{th}$ moment; and equi-proportionally adding valid special effect cells to the first position based on the quantity of valid special effect cells corresponding to the diffusion range of the virtual fluid substance at the $i^{th}$ moment and the quantity of valid special effect cells occupied by the dynamic virtual obstacle at the second position, and diffusing the virtual fluid substance based on the added valid special effect cells, a quantity of valid special effect cells corresponding to the diffusion range of the virtual fluid substance varying in a normal distribution over time, and i being a positive integer.

8. The method according to claim 1, further comprising:

selecting the special effect cells in the first range centered around the explosion point of the virtual throwable;

traversing the special effect cells in the first range based on a preset frequency, and refreshing the valid special effect cell in the first range satisfying the valid diffusion condition; and determining the diffusion direction of the virtual fluid substance based on the refreshed valid special effect cell when the virtual fluid substance encounters a dynamic virtual obstacle during the diffusion.

9. A computer device, comprising a processor and a memory, the memory having at least one computer program stored therein, the at least one computer program, when loaded and executed by the processor, causing the computer device to implement a method for controlling a virtual throwable including:

in response to a thrown virtual throwable exploding and releasing a virtual fluid substance in a virtual environment picture, defining special effect cells in a first range centered around an explosion point of the virtual throwable;

traversing the special effect cells in the first range, and identifying, among the special effect cells, one or more valid special effect cells in the first range satisfying a valid diffusion condition; and when the virtual fluid substance encounters a virtual obstacle during diffusion, diffusing the virtual fluid substance based on one of the one or more valid special effect cells on a surface of the virtual obstacle, the valid diffusion condition comprising at least one of the one or more valid special effect cells not overlapping the virtual obstacle.

10. The computer device according to claim 9, wherein the traversing the special effect cells in the first range, and identifying, among the special effect cells, one or more valid special effect cells in the first range satisfying a valid diffusion condition comprises:

selecting a special effect cell at which the explosion point is located as a starting point for traversing other special effect cells;

traversing special effect cells adjacent to the starting special effect cell, determining, among the special effect cells adjacent to the starting special effect cell, a special effect cell that satisfies the valid diffusion condition as a valid special effect cell, and determining the special effect cell as a next starting special effect cell; and repeating the above operation until all of the special effect cells in the first range are traversed.

11. The computer device according to claim 10, wherein the selecting a special effect cell at which the explosion point is located as a starting point for traversing other special effect cells comprises:

using a special effect cell in the first range satisfying a ray detection condition as the starting special effect cell when the special effect cell at which the explosion point is located is not a valid special effect cell, the ray detection condition comprising a to-be-detected special effect cell being connected to the special effect cell at which the explosion point is located by a ray and the to-be-detected special effect cell not overlapping the virtual obstacle.

12. The computer device according to claim 9, wherein the virtual environment picture comprises a virtual object; and the method further comprises:

selecting the special effect cells centered around the explosion point of the virtual throwable in the first range and outside a second range, the second range indicating the diffusion range of the virtual fluid substance; and reducing an attribute value of the virtual object in response to a distance between a special effect cell at which the virtual object is located and the special effect cell at which the explosion point is located being less than a maximum distance value of the second range.

13. The computer device according to claim 12, wherein the attribute value comprises a health point and/or a skill point; and the reducing an attribute value of the virtual object in response to a distance between a special effect cell at which the virtual object is located and the special effect cell at which the explosion point is located being less than a maximum distance value of the second range comprises:

reducing the health point and/or the skill point of the virtual object in response to the distance between the special effect cell at which the virtual object is located and the special effect cell at which the explosion point is located being less than the maximum distance value of the second range.

14. The computer device according to claim 9, wherein the method further comprises:

selecting the special effect cells in the first range centered around the explosion point of the virtual throwable; and determining, based on a distance between a current special effect cell and the special effect cell at which the explosion point is located, a transparency of a virtual fluid substance corresponding to the current special effect cell, the distance between the current special effect cell and the special effect cell at which the explosion point is located being positively correlated with the transparency of the virtual fluid substance corresponding to the current special effect cell.

15. The computer device according to claim 9, wherein the method further comprises:

selecting the special effect cells in the first range centered around the explosion point of the virtual throwable;

traversing the special effect cells in the first range, and identifying, among the special effect cells in the first range, the special effect cell in the first range satisfying the valid diffusion condition as a valid special effect cell;

determining, based on a diffusion range of the virtual fluid substance at an $i^{th}$ moment, a quantity of valid special effect cells corresponding to the diffusion range at the $i^{th}$ moment and a first position occupied by a dynamic virtual obstacle;

determining a quantity of valid special effect cells occupied by the dynamic virtual obstacle in response to the dynamic virtual obstacle moving to a second position at an $(i+1)^{th}$ moment; and equi-proportionally adding valid special effect cells to the first position based on the quantity of valid special effect cells corresponding to the diffusion range of the virtual fluid substance at the $i^{th}$ moment and the quantity of valid special effect cells occupied by the dynamic virtual obstacle at the second position, and diffusing the virtual fluid substance based on the added valid special effect cells, a quantity of valid special effect cells corresponding to the diffusion range of the virtual fluid substance varying in a normal distribution over time, and i being a positive integer.

16. The computer device according to claim 9, wherein the method further comprises:

selecting the special effect cells in the first range centered around the explosion point of the virtual throwable;

traversing the special effect cells in the first range based on a preset frequency, and refreshing the valid special effect cell in the first range satisfying the valid diffusion condition; and determining the diffusion direction of the virtual fluid substance based on the refreshed valid special effect cell when the virtual fluid substance encounters a dynamic virtual obstacle during the diffusion.

17. A non-transitory computer-readable storage medium, having at least one computer program stored therein, the at least one computer program, when loaded and executed by a processor of a computer device, causing the computer device to implement a method for controlling a virtual throwable including:

in response to a thrown virtual throwable exploding and releasing a virtual fluid substance in a virtual environment picture, defining special effect cells in a first range centered around an explosion point of the virtual throwable;

traversing the special effect cells in the first range, and identifying, among the special effect cells, one or more valid special effect cells in the first range satisfying a valid diffusion condition; and when the virtual fluid substance encounters a virtual obstacle during diffusion, diffusing the virtual fluid substance based on one of the one or more valid special effect cells on a surface of the virtual obstacle, the valid diffusion condition comprising at least one of the one or more valid special effect cells not overlapping the virtual obstacle.

18. The non-transitory computer-readable storage medium according to claim 17, wherein the traversing the special effect cells in the first range, and identifying, among the special effect cells, one or more valid special effect cells in the first range satisfying a valid diffusion condition comprises:

selecting a special effect cell at which the explosion point is located as a starting point for traversing other special effect cells;

traversing special effect cells adjacent to the starting special effect cell, determining, among the special effect cells adjacent to the starting special effect cell, a special effect cell that satisfies the valid diffusion condition as a valid special effect cell, and determining the special effect cell as a next starting special effect cell; and repeating the above operation until all of the special effect cells in the first range are traversed.

19. The non-transitory computer-readable storage medium according to claim 17, wherein the virtual environment picture comprises a virtual object; and the method further comprises:

selecting the special effect cells centered around the explosion point of the virtual throwable in the first range and outside a second range, the second range indicating the diffusion range of the virtual fluid substance; and reducing an attribute value of the virtual object in response to a distance between a special effect cell at which the virtual object is located and the special effect cell at which the explosion point is located being less than a maximum distance value of the second range.

20. The non-transitory computer-readable storage medium according to claim 17, wherein the method further comprises:

selecting the special effect cells in the first range centered around the explosion point of the virtual throwable; and determining, based on a distance between a current special effect cell and the special effect cell at which the explosion point is located, a transparency of a virtual fluid substance corresponding to the current special effect cell, the distance between the current special effect cell and the special effect cell at which the explosion point is located being positively correlated with the transparency of the virtual fluid substance corresponding to the current special effect cell.

* * * * *